United States Patent [19]

Izawa et al.

[11] Patent Number: 5,726,703
[45] Date of Patent: Mar. 10, 1998

[54] STEREOSCOPIC IMAGE DISPLAY SYSTEM

[75] Inventors: Masataka Izawa; Kazuto Sato; Nozomu Kikuchi; Ryuji Miyazaki; Hirokazu Izumi, all of Tokyo, Japan

[73] Assignee: Pioneer Electronic Corporation, Tokyo, Japan

[21] Appl. No.: 678,588

[22] Filed: Jul. 12, 1996

[30] Foreign Application Priority Data

Jul. 14, 1995 [JP] Japan .................... 7-201323
Jan. 22, 1996 [JP] Japan .................... 8-027288
Feb. 13, 1996 [JP] Japan .................... 8-049528

[51] Int. Cl.$^6$ .................. H04N 13/02; H04N 15/00
[52] U.S. Cl. .................. 348/46; 348/58; 348/59
[58] Field of Search ............ 348/46, 51, 55-59; 313/477 R, 478; H04N 13/02, 15/00

[56] References Cited

U.S. PATENT DOCUMENTS

| | | |
|---|---|---|
| 4,021,846 | 5/1977 | Roese ........................ 350/150 |
| 5,311,220 | 5/1994 | Eichenlaub .................. 348/55 |
| 5,428,366 | 6/1995 | Eichenlaub .................. 348/59 |

*Primary Examiner*—Tommy P. Chin
*Assistant Examiner*—Luanne P. Din
*Attorney, Agent, or Firm*—Nikaido Marmelstein Murray & Oram LLP

[57] ABSTRACT

A stereoscopic image display system has a left/right stereoscopic image signal generator for alternately generating left-eye and right-eye image signals at every field, a screen for projecting image light, a liquid crystal shutter. The liquid crystal shutter has a response speed of 1 ms or less, and a contrast between black and white of 100 to 1 or more at a central wavelength of an emission spectrum of a CRT in both parallel and crossing modes of the polarizing plates of the shutter, and a cell gap of 3 μm or less. The screen comprises a Fresnel lens and a lenticular sheet, and the lenticular sheet is disposed in a direction so that a polarizing condition does not generate a phase difference based on the lenticular sheet.

8 Claims, 24 Drawing Sheets

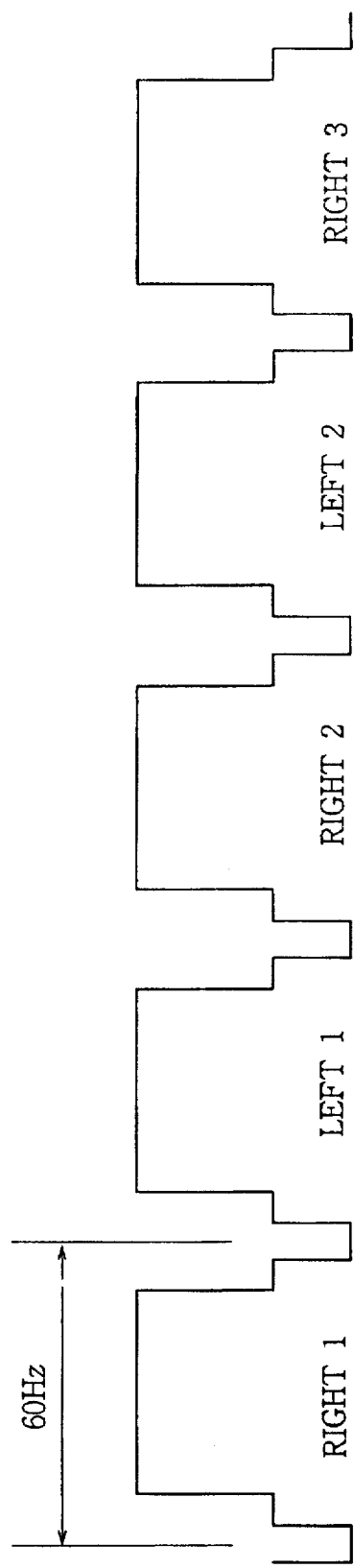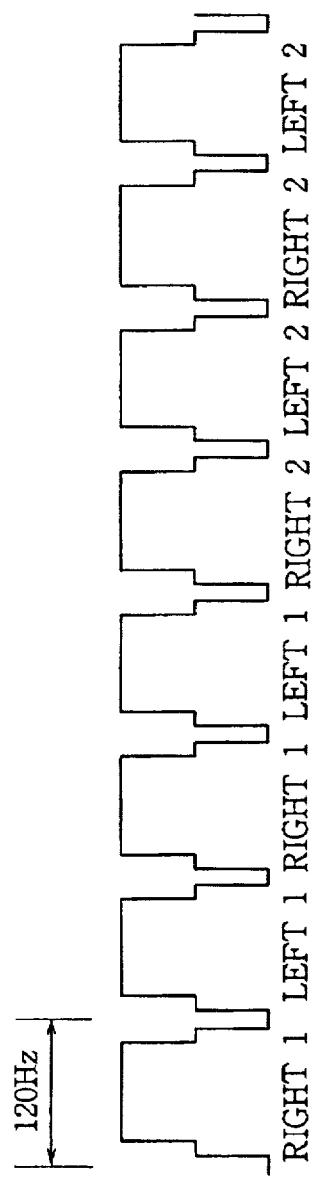

VISIBLE AREA

VISIBLE AREA

FIG.18

| | POLARIZATION OF LIGHT SOURCE | PHASE DIFFERENCE $\Delta\delta$ (IDEAL CONDITION) | POLARIZATION AT SCREEN | POLARIZING GLASSES |
|---|---|---|---|---|
| A | CIRCULARLY POLARIZED LIGHT | $N\pi$ | CIRCULAR | CIRCULAR |
| B | CIRCULARLY POLARIZED LIGHT | $N\pi \pm \pi/2$ | LINEAR | LINEAR |
| C | LINEARLY POLARIZED LIGHT | $N\pi$ | LINEAR | LINEAR |
| D | LINEARLY POLARIZED LIGHT | $N\pi \pm \pi/2$ | CIRCULAR | CIRCULAR |
| E | LINEARLY POLARIZED LIGHT | PHASE DIFFERENCE ARBITRARY (OPTICAL AXIS DIRECTION) $\phi s$ : SAME | LINEAR | LINEAR |

$N = 0, \pm 1, \pm 2 \ldots$

STEREOSCOPIC IMAGE DISPLAY SYSTEM

BACKGROUND OF THE INVENTION

The present invention relates to a stereoscopic image display system which may eliminate disadvantages deteriorating a characteristic of the stereoscopic image, thereby improving quality of the stereoscopic image.

As a conventional projection type stereoscopic image display system using polarization based on binocular parallax, there is a stereoscopic image display system having a reflecting mirror used for reflecting the light from a projector on a screen from a rear of the screen.

FIG. 25 shows a projection type conventional stereoscopic image display system having three projection CRTs for the primary colors of red (R), green (G) and blue (B).

The system comprises an image signal generator 1 having image signals for a right eye and a left eye of a viewer which are alternately disposed every field. The right-eye image signal and the left-eye image signal are applied to a changeover circuit 2 where one of the right-eye and left-eye image signals is selected. The changeover circuit 2 further has a separation circuit for separating R, G and B color signals, and a horizontal synchronizing signal and a vertical synchronizing signal from the image signals. A synchronizing signal generator 3 generates a synchronizing signal for controlling the changeover circuit 2. The changeover circuit 2 produces a selected image signal which is applied to an image display device 4 (for example, a projection CRT) where a right-eye image or a left-eye image is alternately displayed every field.

The image display device 4 emits the light of image through a polarizing plate 5 and a polarizing shutter 6. The polarizing plate 5 is provided for polarizing the light of image to a linearly polarized light having a predetermined polarizing axis. The polarizing shutter 6 (for example, liquid crystal shutter) is controlled by the synchronizing signal from the synchronizing signal generator 3. The polarizing shutter 6 operates to control a direction of the polarizing axis of the light emitted from the shutter when the right-eye image is displayed on the image display device 4, and a direction of the polarizing axis of the light emitted from the shutter when the left-eye image is displayed on the image display device 4, such that the directions of the respective polarizing axes are perpendicular to each other.

The light of image projected from the image display device 4 strikes a reflecting mirror 7 passing through the polarizing plate 5 and the polarizing shutter 6. The light of image is reflected from the reflecting mirror 7 and projected on a screen 10 comprising a lenticular sheet 8 and a Fresnel lens 9 at a rear thereof.

In order to watch a stereoscopic image on the screen 10, a pair of polarizing glasses 11 are used to unite the right-eye image and the left-eye image. The glasses 11 have a right lens comprising a polarizing filter having a polarizing axis parallel with the polarizing axis of the light for the right-eye image, and a left lens comprising a polarizing filter having a polarizing axis parallel with the polarizing axis of the light for the left-eye image. Since the right eye watches only the right-eye image and the left eye watches only the left-eye image, one stereoscopic image is obtained.

In the system, the light of image is projected on the screen 10 passing through various parts such as shutter, reflecting mirror and screen. Since these parts have natures which affect the stereoscopic image to deteriorate the quality of the image, Problems arise on the persistence and crosstalk caused by these parts. Namely, (1) the persistence of the image display device deteriorates an efficiency of separation of the right-eye and left-eye images, (2) response and contrast ratio of the shutter increase crosstalk, (3) reflectance between P wave and S wave reflected from the reflecting mirror is different from each other so that a phase difference occurs, causing the efficiency of separation of the right-eye and left-eye images to deteriorate, and (4) in the screen, optical anisotropy of the material affects the image to be deteriorated.

These disadvantages are appeared as phenomena of afterimage, efficiency of separation and crosstalk. Accordingly, quality and stereoscopic characteristic of the stereoscopic image decrease.

SUMMARY OF THE INVENTION

An object of the present invention is to provide a stereoscopic image display system in which crosstalk between right-eye and left-eye images is reduced, thereby preventing the stereoscopic image from deteriorating.

According to the present invention, there is provided a stereoscopic image display system having left/right stereoscopic image signal generator means for alternately generating RGB signals of a left-eye image signal and a right-eye image signal having a parallax at every field, a CRT applied with the RGB signals, a screen for projecting image light of the RGB signals, shutter means having a liquid crystal shutter with a pair of polarizing plates disposed in inlet and outlet sides, and driving means for driving the liquid crystal shutter and for rotating the polarizing plate, thereby displaying stereoscopic images dependent on the left/right stereoscopic image signal.

The system comprises the CRT having a persistence characteristic represented by following formulas, $$s1/s2 \geq 100 \text{ and } f(0)/10 > f(1.3)$$

where $$s1 = \lim_{n1 \to \infty} \sum_{i=0}^{n1} f(i) \cdot \Delta t$$

$$n1 = (t1 - t0)/\Delta t$$

$$s2 = \lim_{n2 \to \infty} \sum_{j=t2}^{n2} f(j) \cdot \Delta t$$

$$n2(t3 - t2)/\Delta t$$

t0 is a stopping time of application of the image signal to the CRT, t1 is a predetermined elapsed time after t0, t2 is a predetermined elapsed time after t1, t3 is a predetermined elapsed time after t2, the liquid crystal shutter having a response speed of 1 ms or less, and a contrast between black and white of 100 to 1 or more at a central wavelength of an emission spectrum of the CRT in both parallel and crossing modes of the polarizing plates of the shutter, and a cell gap of 3 μm or less, and the screen including a Fresnel lens and a lenticular sheet, and the lenticular sheet being disposed in a direction so that a polarizing condition does not generate a phase difference based on the lenticular sheet.

The system further comprises a reflecting mirror for reflecting the image light from the CRT and for projecting the reflected light to the screen, wherein the reflecting mirror comprises a glass, a metallic film coated on the glass, double-layered dielectric films, thickness and refractive index of each of the dielectric films are set to predetermined values respectively, so that the phase difference between the P wave and the S wave is between −45 and 45 degrees when an incident angle of the image light is between zero and 65 degrees, and horizontal scanning means having a higher scanning frequency than a horizontal scanning frequency of the stereoscopic image signal.

Each of the Fresnel lens and the lenticular sheet is made of a material having a small optical elastic coefficient.

The metallic film is formed by aluminum, the dielectric films comprise a first dielectric film of a material including SiO, and a second dielectric film of a material including $MgF_2$, each of the dielectric films includes at least one compound selected from $Ti_2O_3$, $ZRO_2$, $Y_2O_3$, SiO, $SiO_2$ and $MgF_2$.

A stereoscopic image display system comprising a plurality of projection units arranged vertically or horizontally.

Each of the projection units has left/right stereoscopic image signal generator means for alternately generating RGB signals of a left-eye image signal and a right-eye image signal having a parallax at every field, a CRT applied with the RGB signals, a screen for projecting image light of the RGB signals, shutter means having a liquid crystal shutter with a pair of polarizing plates disposed in inlet and outlet sides, and driving means for driving the liquid crystal shutter and for rotating the polarizing plate, thereby displaying stereoscopic images dependent on the left/right stereoscopic image signal.

The system comprises the screens of all units being joined each other to form a single screen, the joined screen being supported in a frame in a suspended condition, a cross-shaped light-shielding black frame being attached to the frame so as to prevent overlapping of images on adjacent screens, the CRT having a persistence characteristic represented by following formulas, $$s1/s2 \geq 100 \text{ and } f(0)/10 > f(1.3)$$

where $$s1 = \lim_{n1 \to \infty} \sum_{i=0}^{n1} f(i) \cdot \Delta t$$

$$n1 = (t1 - t0)/\Delta t$$

$$s2 = \lim_{n2 \to \infty} \sum_{j=t2}^{n2} f(j) \cdot \Delta t$$

$$n2(t3 - t2)/\Delta t$$

t0 is a stopping time of application of the image signal to the CRT, t1 is a predetermined elapsed time after t0, t2 is a predetermined elapsed time after t1, t3 is a predetermined elapsed time after t2, the liquid crystal shutter having a response speed of 1 ms or less, and a contrast between black and white of 100 to 1 or more at a central wavelength of an emission spectrum of the CRT in both parallel and crossing modes of the polarizing plates of the shutter, and a cell gap of 3 μm or less, and the screen including a Fresnel lens and a lenticular sheet, and the lenticular sheet being disposed in a direction so that a polarizing condition does not generate a phase difference based on the lenticular sheet.

These and other objects and features of the present invention will become more apparent from the following detailed description with reference to the accompanying drawings.

BRIEF DESCRIPTION OF DRAWINGS

FIGS. 4a and 4b are diagrams showing waveforms of image signals for right and left eyes;

FIG. 18 is a list showing ideal phase differences of a screen in dependency on modes of polarized light;

DETAILED DESCRIPTION OF THE PREFERRED EMBODIMENTS

Figure 1:
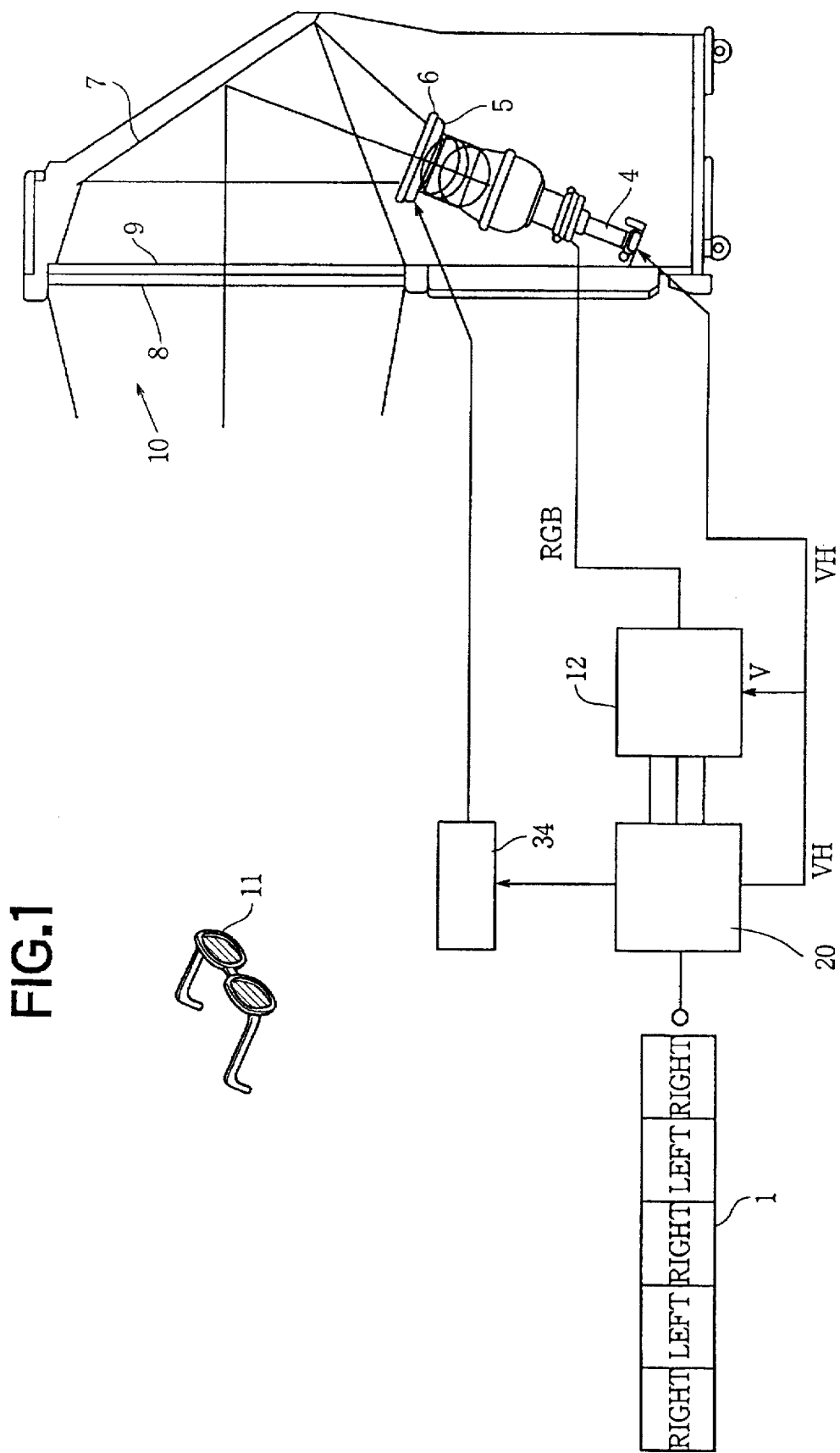
FIG. 1 is a schematic diagram showing a stereoscopic image display system according to the present invention.
Figure 25:
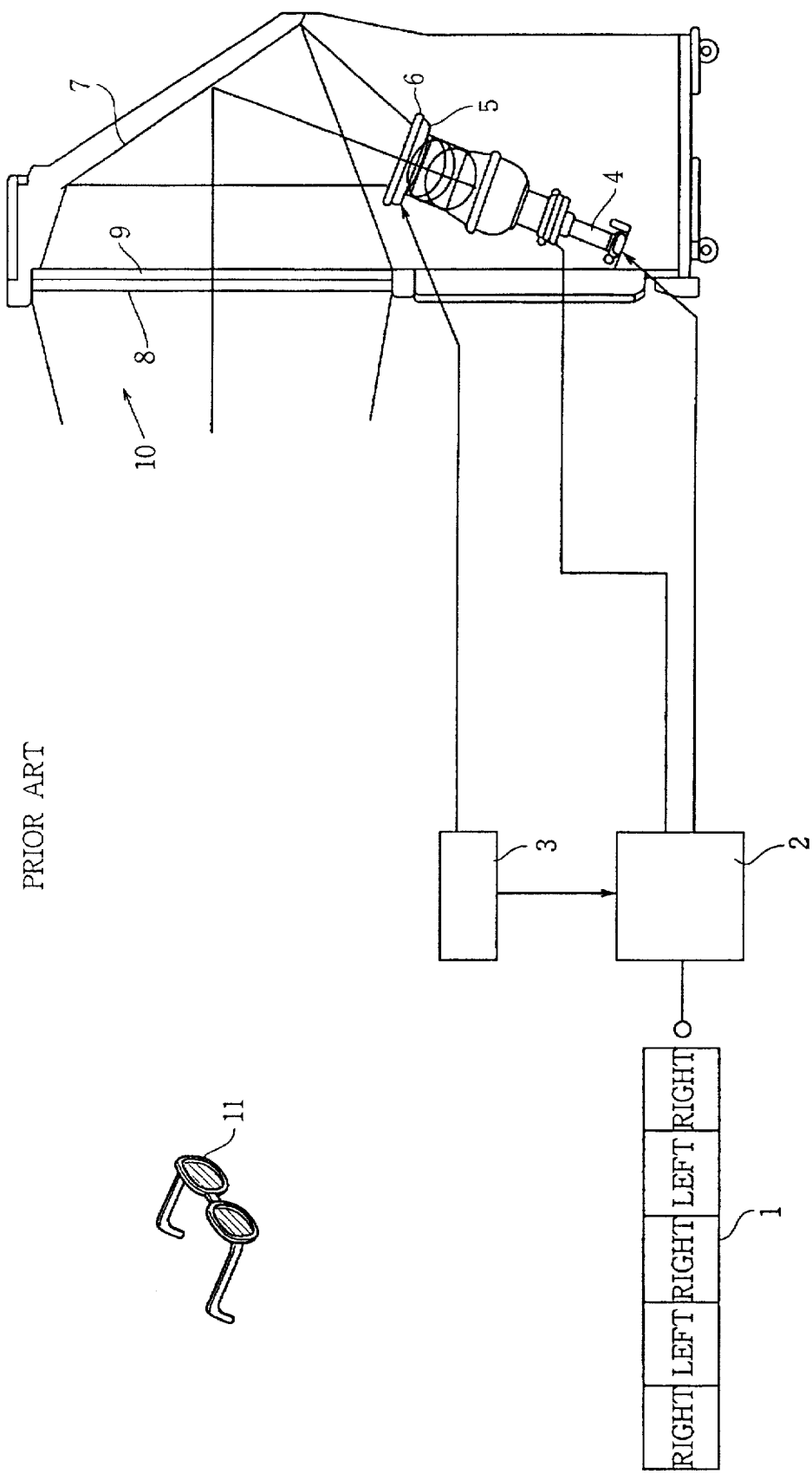
FIG. 25 is a schematic diagram showing a conventional stereoscopic image display system.

Referring to FIG. 1 showing a stereoscopic image display system of the present invention, parts which are the same as the conventional system are identified with the same reference numerals as FIG. 25.

The system comprises an image signal doubling circuit 20 for doubling the number of the image signals applied from the left/right-eye image signal generator 1, which will be described hereinafter in detail. A changeover circuit 12 is provided for changing the R, G and B color signals applied from the image signal doubling circuit 20 to the image signal. A shutter driving circuit 34 operates to drive the liquid crystal shutter 6 and to rotate a polarizing plate of the liquid crystal shutter.

The projection CRT 4, polarizing plate 5, reflecting mirror 7, and screen 10 having lenticular sheet 8 and Fresnel lens 9, which are the same as the conventional system of FIG. 25 are further provided.

In place of the linearly polarized light described in the conventional system, a circularly polarized light may be used in the embodiment.

A structural part of the system will be individually described in order to resolve the problems on afterimage and crosstalk which cause the quality of the stereoscopic image to deteriorate.

(1) PROJECTION CRT

Figure 2:
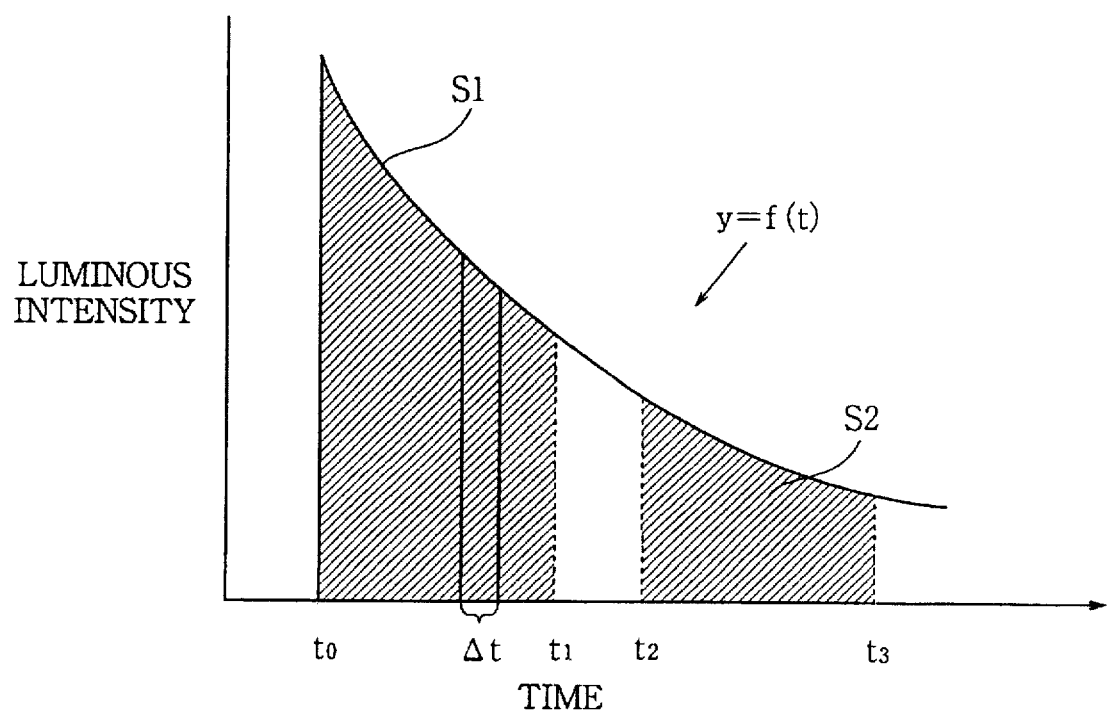
FIG. 2 is a diagram showing a characteristic of persistence of a projection CRT of the system.

The projection CRT 4 as the image display device has a characteristic of persistence as shown in FIG. 2 where the ordinate shows luminous intensity and the abscissa shows elapsed time after the projection CRT stops for emitting the light. The persistence characteristic (y) is represented as a function of time f by y=f(t). It will be seen that when the projection CRT 4 stops for emitting the light at a time t0, the persistence is gradually reduced thereafter as the time passes.

An area s1 represents an amount of luminous intensity obtained by integrating luminous intensity between the time t0 and a time t1 by a time interval Δt. Similarly, an area s2 represents an amount of luminous intensity obtained by integrating luminous intensity between a time t2 and a time t3 by the time interval Δt.

The fact that the area s2 is smaller than the area s1 means that the period from the stopping of the projection CRT to the time when the light is not recognized is short, and hence the persistence characteristic is small.

The applicant has found out that if the projection CRT having following conditions, a phenomenon of afterimage of right and left eyes is not affected by the persistence characteristic of the projection CRT.

$$s1/s2 \geq 100 \text{ and } f(0)/10 > f(1.3)$$

where $$s1 = \lim_{n1 \to \infty} \sum_{i=0}^{n1} f(i) \cdot \Delta t$$

$$n1 = (t1 - t0)/\Delta t$$

$$s2 = \lim_{n2 \to \infty} \sum_{j=t2}^{n2} f(j) \cdot \Delta t$$

$$n2(t3 - t2)/\Delta t$$

t0 is a stopping time of application of the image signal to the CRT, t1 is a predetermined elapsed time after t0, t2 is a predetermined elapsed time after t1, t3 is a predetermined elapsed time after t2. Although the method for adjusting the persistence characteristic of CRT is well-known, the persistence characteristic of the CRT can be, for example, obtained by adjusting the mixing ratio of fluorescent materials in the CRT. For example, if the mixing ratio of P46 green fluorescent material to P53 green fluorescent material is 2–30%, the persistence time is below 0.6 ms (Japanese Laid Open 8-22778, published on Jan. 23, 1996)

In other words, the ratio of the area s1 to the area s2 is 100 or more, and the luminous intensity after elapsed time f(1.3), namely 1.3 ms from the time t0 is smaller than 1/10 of the luminous intensity at the time t0.

An electric circuit can be employed for developing the system in addition to the above descried projection CRT. The circuit uses a method to compress an image in a vertical direction. In the method, a blank area is provided between the right-eye field and the left-eye field in order to remove the afterimage of the last field during the blank area.

In the embodiment, the image signal doubling circuit 20 is provided for achieving the aforementioned method.

Figure 3:
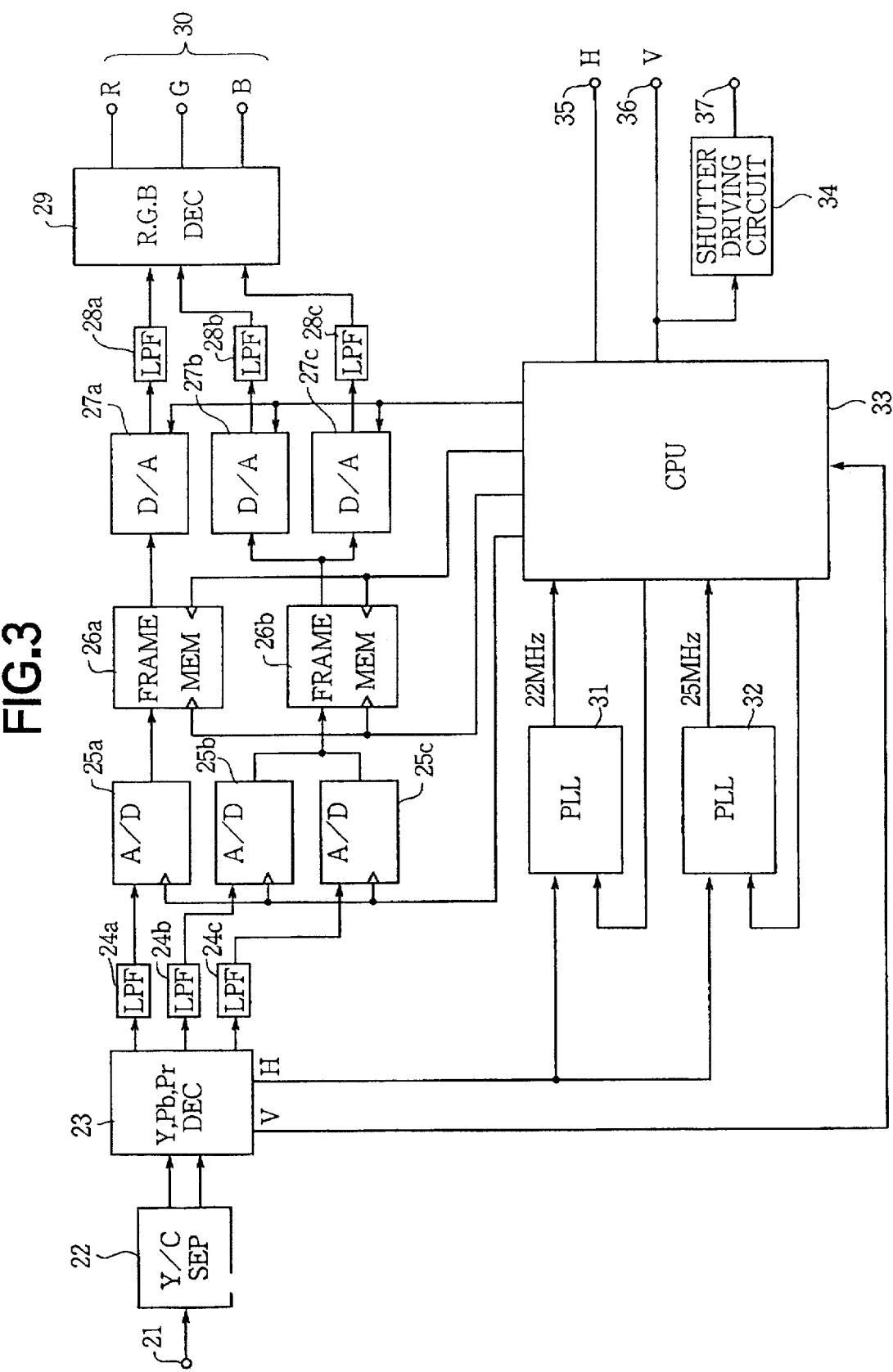
FIG. 3 is a block diagram showing a multiple speed circuit of the system.

Referring to FIG. 3 showing the image signal doubling circuit 20, an input terminal 21 is applied with the image signal from the image signal generator 1. The input terminal 21 is connected to a Y/C separation circuit 22 where the image signal is separated into a luminance signal Y and a color signal C. The Y and C signals are applied to a color difference decoder 23 where the signal C is separated into color difference signals Pr(R-Y) and Pb(B-Y), and a vertical synchronizing signal V for the vertical scanning and a horizontal synchronizing signal H for the horizontal scanning. The Y signal, Pr and Pb signals are applied to A/D converters 25a, 25b and 25c through LPFs 24a, 24b and 14c, respectively. In the respective A/D converters 25a, 25b and 25c, the Y, Pr and Pb signals are converted into digital signals. The converted Y signal is stored in a frame memory 26a, and converted Pr and Pb signals are stored in a frame memory 26b. The signal stored in the frame memory 26a is applied to a D/A converters 27a, and signals stored in the frame memory 26b are applied to D/A converters 27b and 27c in accordance with a command of a CPU 33, respectively. In the D/A converters 27a to 27c, the digital signals are converted into analog signals.

The horizontal synchronizing signal H from the decoder 23 is applied to PLL circuits 31 and 32, respectively. In the PLL circuit 31, a clock frequency of about 22 MHz in synchronism with the horizontal synchronizing signal H is obtained. In the PLL circuit 32, a clock frequency of about 25 MHz in synchronism with the horizontal synchronizing signal H is obtained. Output signals of PLL circuits 31, 32 are applied to the CPU 33 which produces clock signals as control signals. The clock signals of 22 MHz and 25 MHz are applied to the A/D converters 25a to 25c, frame memories 26a and 26b, and D/A converters 27a to 27c.

In the A/D converters 25a, 25b and 25c, the Y, Pr and Pb signals are converted into digital signals with the clock signal. The converted Y, Pr and Pb signals are written in the frame memories 26a and 26b with the clock signal. The data of digital signals stored in the frame memories 26a and 26b are read out in accordance with control signals from the CPU 33 with the clock signal as described hereinafter in detail.

The converted analog signals from the D/A converters 27a to 27c are applied to an RGB decoder 29 through LPFs 28a, 28b and 28c, so that the primary colors R, B and G are decoded and applied to output terminals 30 for RGB.

The vertical synchronizing signal V from the decoder 23 is applied to the CPU 33. The vertical synchronizing signal V is further applied to the shutter driving circuit 34 where a shutter driving signal is detected by the vertical synchronizing signal V and applied to an output terminal 37.

FIG. 4a shows the output signals of the left/right-eye image signal generator 1 which alternately generates left-eye and right-eye image signals having a parallax at every field (field frequency is 60 Hz), as illustrated. The image signals are applied to the image signal doubling circuit 20, where the image signals are decoded and converted to digital signals as described above.

The digital signals are written in the frame memories 26a and 26b every frame (two fields) at the clock frequency (22 MHz). The stored data of each field is read out at a frequency twice as higher as the clock frequency two times. Thus, the field frequency becomes twice (120 Hz), and the data are read out right eye 1, left eye 1, right eye 1, left eye 1, right eye 2, left eye 2, right eye 2, left eye 2, right eye 3 . . . as shown in FIG. 4b.

On the other hand, a deflection current is obtained by a deflection circuit with the synchronizing signal of the image signal. Namely, a horizontal deflection current is obtained by the clock frequency of the PLL circuit 31 which is twice the horizontal synchronizing frequency, namely, 31.5 kHz. The horizontal deflection current is output from the output terminal 35.

Similarly, a vertical deflection current is obtained by the clock frequency which is twice the vertical synchronizing frequency, namely, the field frequency of 120 Hz. The vertical deflection current is output from the output terminal 36.

The method for compressing the image in the vertical direction will be described. As above described, data of each field is written in the frame memory with the clock signal of about 22 MHz, and read out at a frequency (25 MHz) higher than a frequency twice as higher as the horizontal synchronizing frequency of the image signal.

Figure 5:
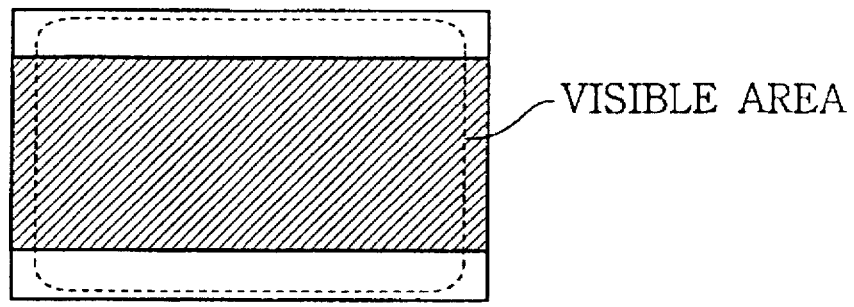
FIGS. 5a and 5b are diagrams showing compression operations of images.
Figure 5:
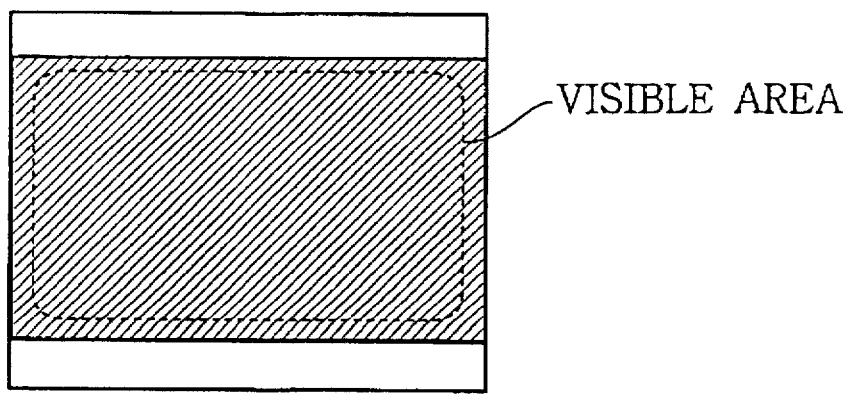

If the image signal is written in and read out with the same clock frequency of 22 MHz, a normal one frame is decoded. However, in the embodiment, since the read-out clock frequency is faster than that of the write-in clock frequency, the image is compressed in the vertical direction as shown in FIG. 5a. Namely, the image of one frame (two fields) is compressed in an inherent visible area of the projection CRT.

The compressed image of one frame is synchronized with the synchronizing signal of the normal one field, so that the signal other than a hatched area of FIG. 5a becomes a black level. Thus, the image of one frame is synchronized in a compressed state with the one field synchronizing signal.

In addition, the convergence of a compressed picture is adjusted, and the picture is expanded in the vertical direction. Thus, as shown in FIG. 5b, the signal in the area other than the hatched area is pushed out of the visible area of the projection CRT, thereby forming an ordinary picture.

The area other than the hatched area is the same area as an area for a vertical retrace line interval of the television so that the viewer can not recognize the area. Thus, since a sufficient time corresponding to the retrace line interval is provided by image compression, it is possible to obtain a sufficient time in the retrace line interval to attenuate the persistence of the projection CRT after one field.

In the embodiment, since the image signal is processed at twice speed, the picture is not defective even if retrace line interval is increased, and flicker peculiar to the stereoscopic image is developed.

(2) LIQUID CRYSTAL SHUTTER

Figure 6:
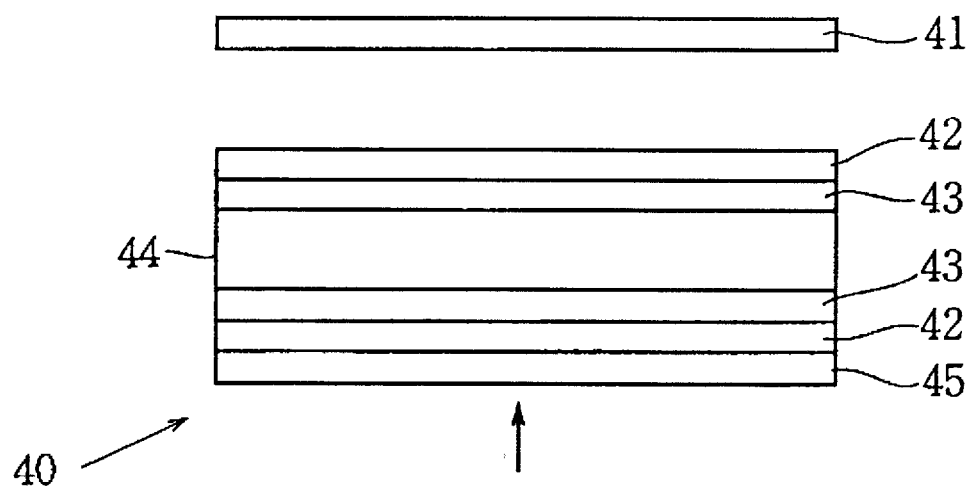
FIG. 6 is schematic sectional views showing a liquid crystal cells of polarizing shutter and polarizing glasses.

Referring to FIG. 6, a liquid crystal cell 40 of the shutter comprises a pair of glass sheets 42, a pair of transparent electrodes 43 secured to inside surfaces of the respective glass sheets 42, liquid crystal 44 interposed between the transparent electrodes 43, and a polarizing plate 45. The thickness of the liquid crystal 44 (hereinafter called cell gap) is less than 3 µm. The right and left glasses of the polarizing glasses 41 have right and left polarizing axes perpendicular to each other, respectively. The polarizing glasses 41 are faced to the liquid crystal cell 40. Thus, a pair of polarizing plates are disposed at opposite sides of the liquid crystal 44.

When a voltage is applied to the liquid crystal cell 40, the polarizing axis of the polarizing plate 45 is rotated 90 degrees which is called rotary polarization. Therefore, when the voltage is applied, the polarizing axis of the polarizing plate 45 becomes parallel with the right or left polarizing axis of the polarizing glasses 41, thereby transmitting the light through the glass. On the other hand, no voltage is applied, the other glass transmits the light.

Figure 7:
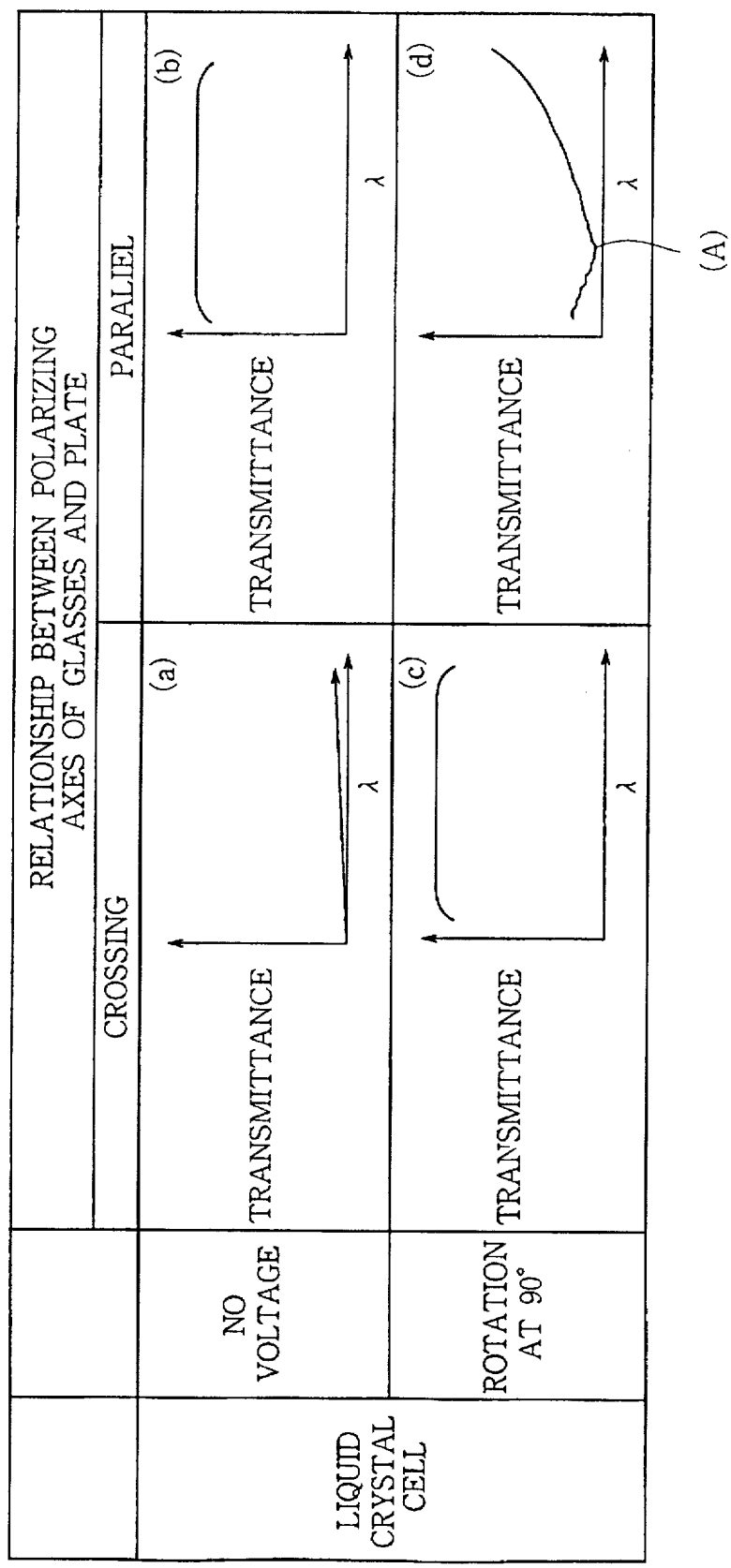
FIG. 7 is a diagram showing a relationship of polarizing axis of the polarizing glasses and a polarizing plate with respect to the conditions of the liquid crystal cell.

FIG. 7 is a list showing graphs of relationships between polarizing axes of the polarizing glasses 41 and the polarizing plate 45 with respect to the conditions of the liquid crystal cell 40. In each of the graphs (a) to (d) of the list, the ordinate shows transmittance and the abscissa shows wavelength of the light. The transmittance is increased in a direction shown by an arrow. In the graphs (a) and (b), the liquid crystal cell 40 is conditioned that voltage is not applied to the cell. In the graphs (c) and (d), voltage is applied to the liquid crystal cell. In the graphs (a) and (c), the polarizing axes of polarizing glasses 41 and polarizing plate 45 are perpendicular to each other. In the graphs (b) and (d), the polarizing axes of polarizing glasses and polarizing plate are parallel with each other.

In the graph (a), it will be seen that the polarizing glasses do not transmit the light. In the graph (b), the polarizing glasses transmit the light irrespective of the wavelength. In the graph (c), the light is also transmitted irrespective of the wavelength.

However, it will be seen that there is transmission spectrum having an area where the light is transmitted in the graph (d), except for a part (A) of the wavelength. In the graph (d), it is desirable that the transmittance is small irrespective of the whole wavelength as shown in the graph (a). The transmission spectrum has a factor which varies in accordance with the gap width of the liquid crystal cell 40.

Figure 8:
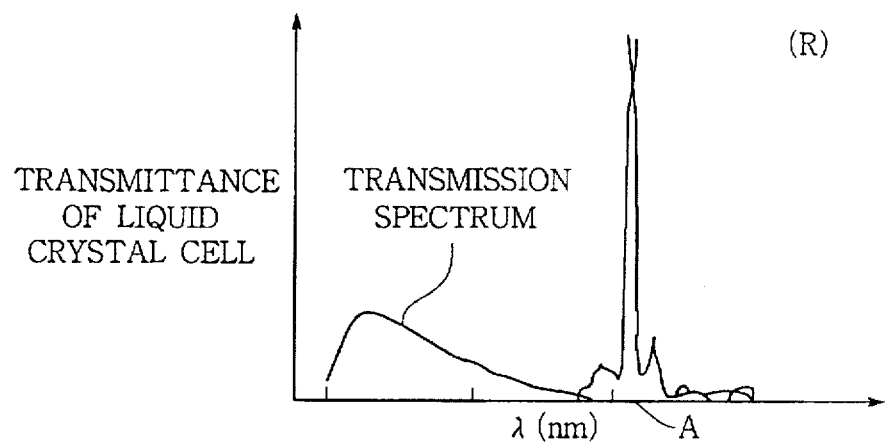
FIGS. 8a, 8b and 8c are diagrams showing relationships between transmitting spectrum of the liquid crystal cell and spectrum of waveforms of B, G and R of the projection CRT.
Figure 8:
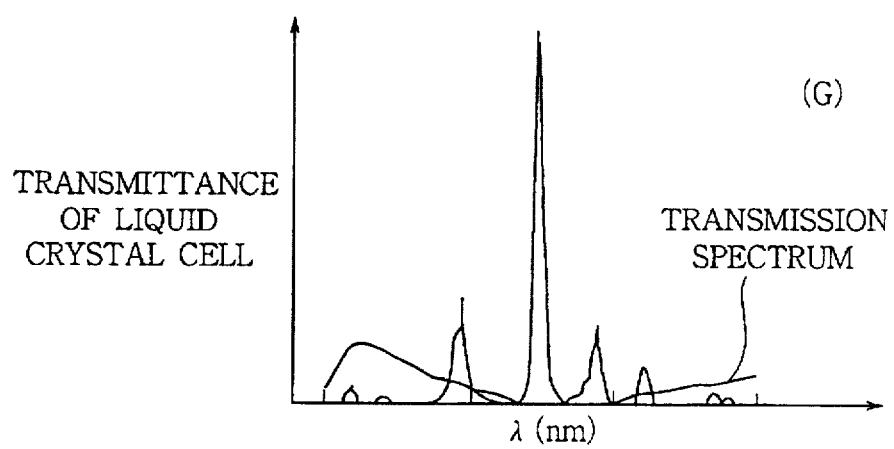
Figure 8:
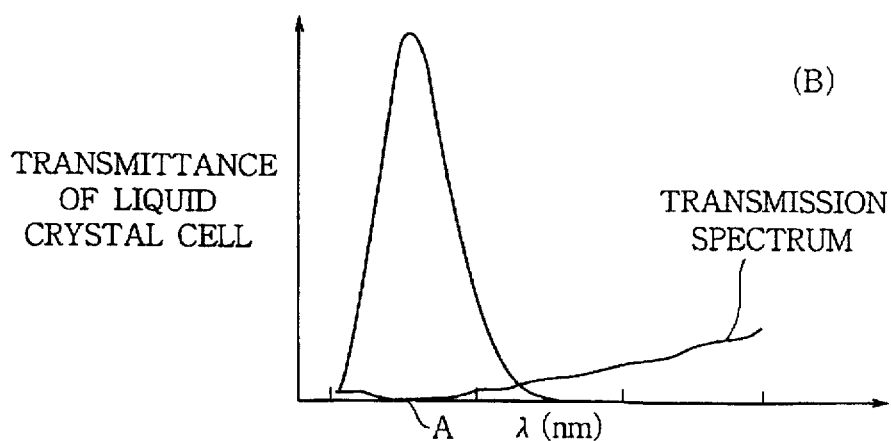

FIGS. 8a, 8b and 8c show relationships between transmitting spectrum of the liquid crystal cell and emission spectrum of waveforms of B, G and R of the projection CRT.

In the embodiment, the gap width of the liquid crystal cell of the shutter 6 is determined so as to coincide the part A of the transmission spectrum of the liquid crystal cell 40 with the peak of the emission spectrum of each of the waveforms of B, G and R of the projection CRT.

Furthermore, the liquid crystal cell is employed with anti-ferroelectric substance, so that the speed of response of the shutter becomes 1 ms or less, and the contrast between black and white becomes 100 to 1 or more at a central wavelength of the emission spectrum of the projection CRT in both parallel and crossing modes in the same rotating directions and opposite rotating direction of the polarizing plates disposed in inlet and outlet sides.

In FIG. 7, the liquid crystal cell is employed with TFT liquid crystal or TN liquid crystal. Thus, if the voltage is not applied, a 0-degree rotatory polarization is achieved, and if voltage is applied, a 90-degree rotatory polarization is achieved.

In the anti-ferroelectric substance liquid crystal, the 0-degree rotatory polarization is achieved when a negative voltage is applied, and the 90-degree rotatory polarization is achieved when a positive voltage is applied.

(3) REFLECTING MIRROR

The reflecting mirror of the present invention is disclosed in Japanese Patent Application No. 6-38838 submitted by the applicant.

Reasons for determining thickness and the kind of a coating film employed with the reflecting mirror will be described.

If the light is reflected from a metallic surface, the phase of the light changes to a P wave and a S wave. The phase difference δ(P-S) between the P wave and the S wave of the reflected light is represented as follows.

$$\delta(P-S)=f(n1, \ominus 1, n2, k)$$

Namely, the phase difference δ(P-S) is represented by a function f of n1, ⊖1, n2, k, where n1 is the refractive index of a material where the light enters, ⊖1 is the angle of incident against the metallic surface, n2 is the refractive index of the metallic film, and K is the absorption coefficient of the light refracted at the metallic surface.

If there is a phase difference between the P wave and the S wave after reflection of the mirror, the polarization of the reflected light becomes an elliptically polarized light. Thus, the separation efficiency of right-eye and left-eye images are deteriorated.

Consequently, in the reflecting mirror of the embodiment, the refractive index and the thickness of the metallic film is selected so as to minimize the phase difference.

The mirror is coated in multilayer so as to prevent the differences of phase and reflectance between the P wave and S wave from increasing at waveforms having strong emission characteristics such as red, green and blue of the projection CRT (a peak of red is near 633 nm, green is 533 nm or 537.8 nm, and blue is 441.6 nm). Thus, the linearly polarized light is prevented from deflecting.

(a) SELECTING METAL FOR A REFLECTING FILM

Figure 9:
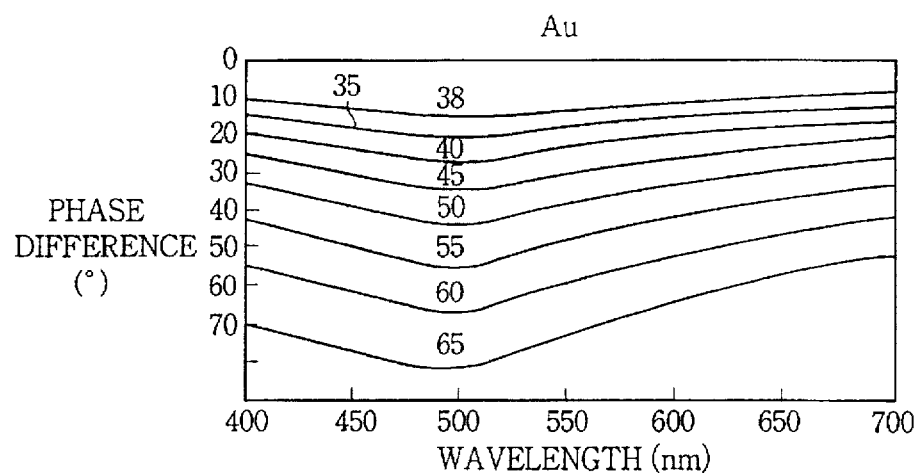
FIGS. 9a, 9b and 9c are diagrams showing reflection characteristics in dependency on a material of metal with respect to phase difference between P wave and S wave and wavelength.
Figure 9:
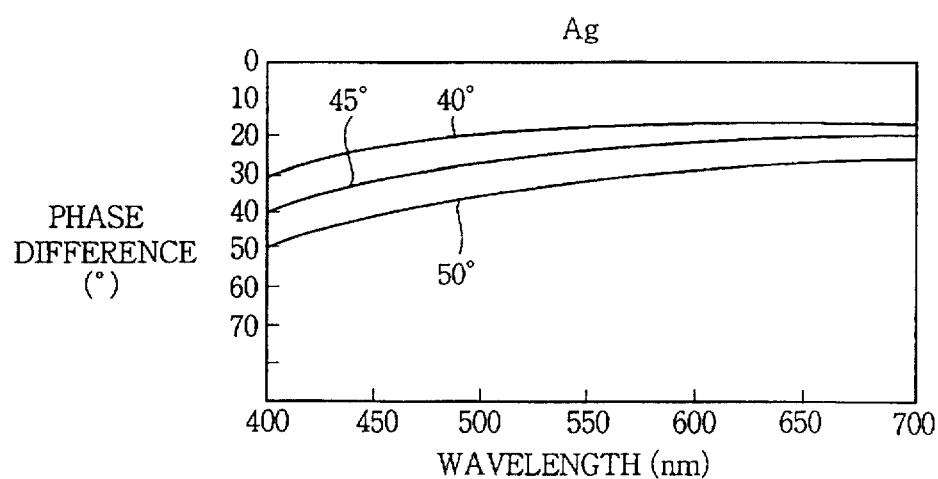
Figure 9:
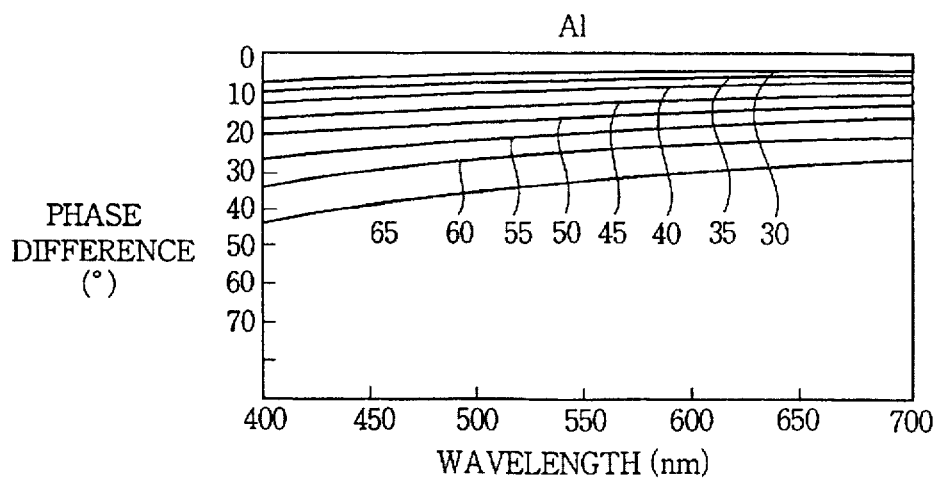

FIGS. 9a, 9b and 9c show the phase differences between the P wave and the S wave in dependency on incident angle with respect to wavelength. FIG. 9a is a reflection characteristic of a metallic film of gold (Au). FIG. 9b is a reflection characteristic of a metallic film of silver (Ag). FIG. 9c is a reflection characteristic of a metallic film of aluminum (Al).

If the incident angle is changed, the phase difference between the P wave and the S wave varies in dependency on refractive index and absorption coefficient.

It will be seen that the phase difference is small if the film of Ag or Al is used. The phase difference is smaller if the film of Al is used which has determined by experiments.

Figure 10:
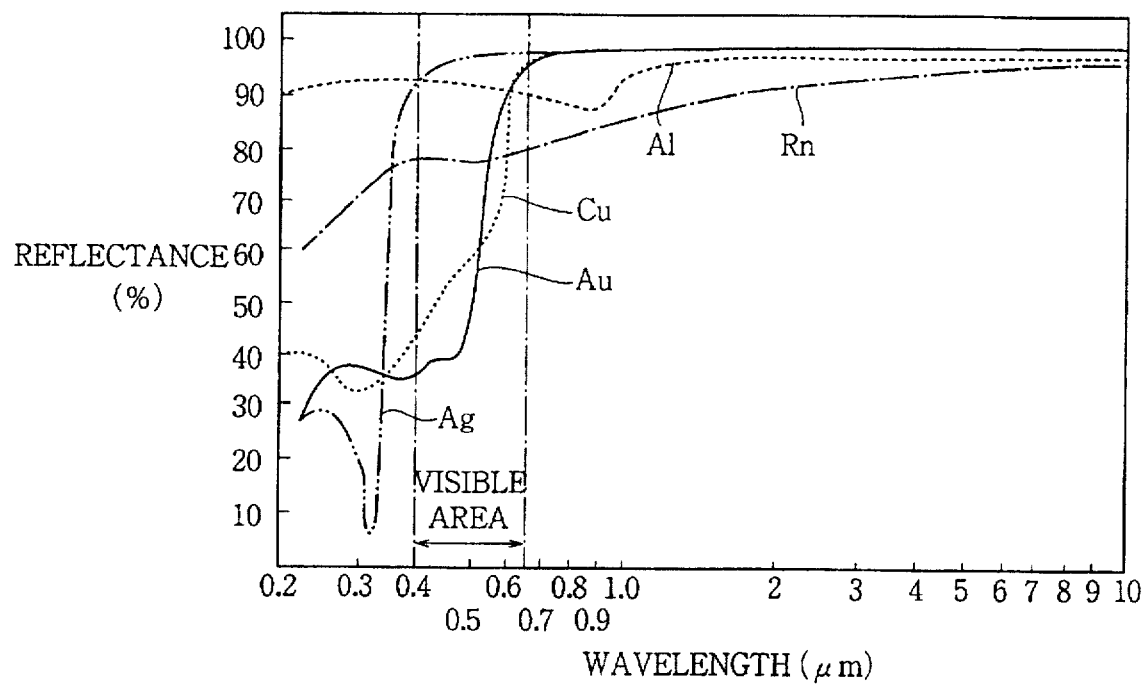
FIG. 10 is a diagram showing a reflectance of each metal.

FIG. 10 shows reflectances of various metals with respect to the wavelength. In a visible area, each of Ag, Al and Rn has a small variation of the reflectance. Since it is prefer to have a high reflectance for the reflecting mirror, Ag or Al is preferable.

In the embodiment, the Al film is used because Al has a good phase characteristic and Al is easily coated by vacuum deposition.

(b) FORMATION OF A DIELECTRIC FILM

If a dielectric film is layered on the Al film, and refractive index and thickness of the dielectric film are selected, the phase difference between P wave and S wave of the light reflected from the Al film is canceled, thereby minimizing the phase difference in a wide range of the incident angle.

Basically, in order to develop the characteristic at a predetermined wavelength λo, the refractive index is selected so that the change of optical path at the time when the incident angle changes is canceled as the change of the phase difference at the wavelength λo. Thus, the incident angle changes to minimize the phase difference.

Figure 11:
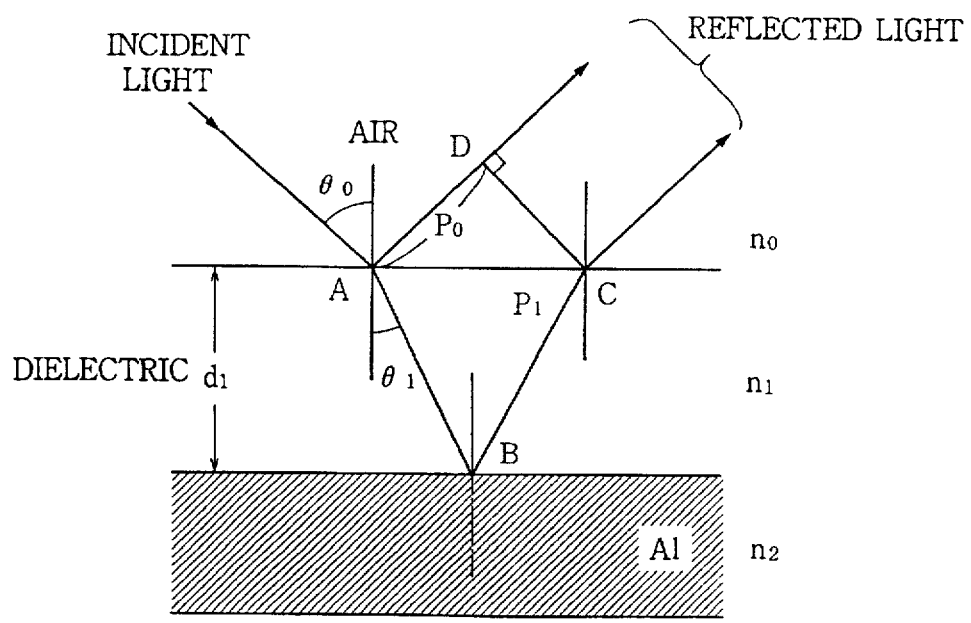
FIG. 11 is a schematic sectional view showing a reflecting mirror having a metal film and a dielectric film.

FIG. 11 shows a reflecting mirror comprising an Al film having refractive index n2, and a dielectric film having refractive index n1, thickness d1 and layered on the Al film.

The incident light enters the dielectric film at an incident angle ⊖o at a point A, and passes through the dielectric film at a refracting angle ⊖1. A part of the light is reflected from the dielectric film to form an optical path Po. The light passing through the dielectric film is reflected from the Al film at a point B to form an optical path P1 and emitted from the dielectric film at a point C. Air has refractive index n0.

The difference between optical paths Po and P1 is obtained as follows.

$$\begin{aligned}
Po &= AD \\
&= 2d1 \cdot n0 \cdot \sin\ominus 1 \cdot \sin\ominus o/\cos\ominus 1 \\
P1 &= AB + BC \\
&= 2 \cdot d1 \cdot n1/\cos\ominus 1
\end{aligned}$$

Thus, the optical path difference (Po-P1) is $$Po-P1 = 2 \cdot d1 \cdot n1(1-(n0 \cdot \sin\ominus o/n1)^2)^{1/2}$$

As an example, it is assumed that the thickness of the dielectric film is λo/4 with respect to the light having the wavelength λo.

$$d1 \cdot n1 = \lambda o/4$$

Thus, $Po-P1 = \lambda o/2 \cdot (1-(n0 \cdot \sin\ominus o/n1)^2)^{1/2}$

If the incident light vertically enters, $$Po-P1 = \lambda o/2$$

FIGS. 12a, 12b, 12c and 13 show characteristics of the incident angle of the reflecting mirror where the dielectric film has the thickness λo/4 in dependency on the refractive index n1.

In FIG. 12a, the dielectric film is formed with TiO₂ having the refractive index n1 of 2.20. In FIG. 12b, the dielectric film is formed with SiO having the refractive index n1 of 1.74. The dielectric film of FIG. 12c is formed with SiO₂ having the refractive index n1 of 1.44. The dielectric film of FIG. 13 is formed with MgF₂ having the refractive index n1 of 1.37.

Figure 12:
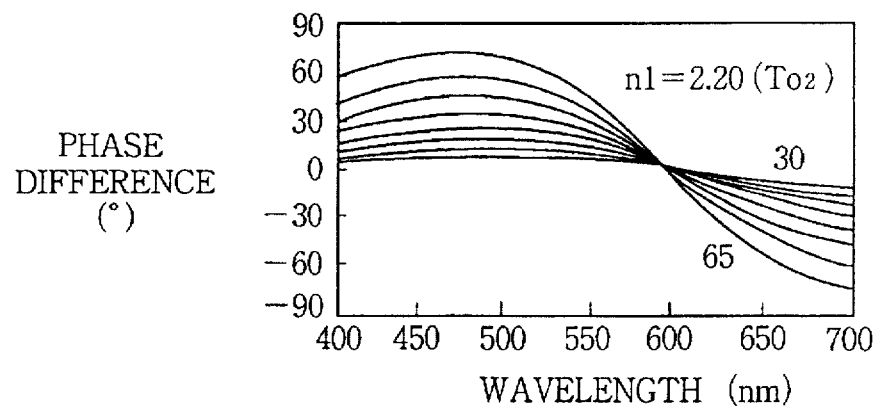
FIGS. 12a, 12b, 12c and 13 are diagrams showing characteristics of angles of incidence of a dielectric film in dependency on refractive index.
Figure 12:
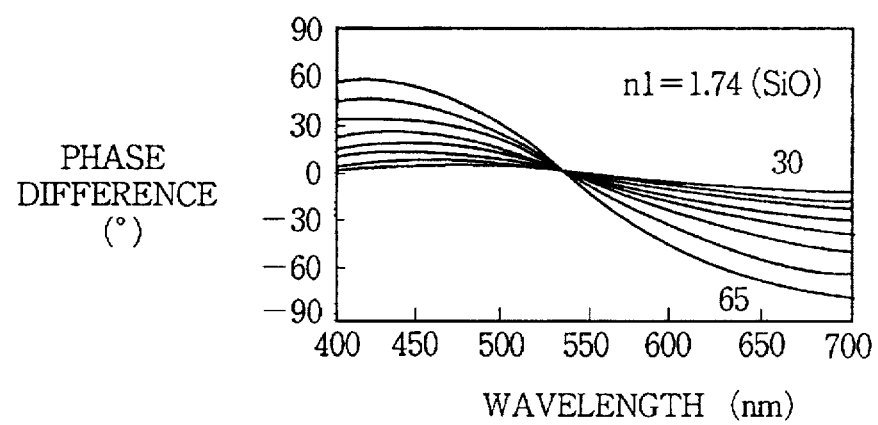
Figure 12:
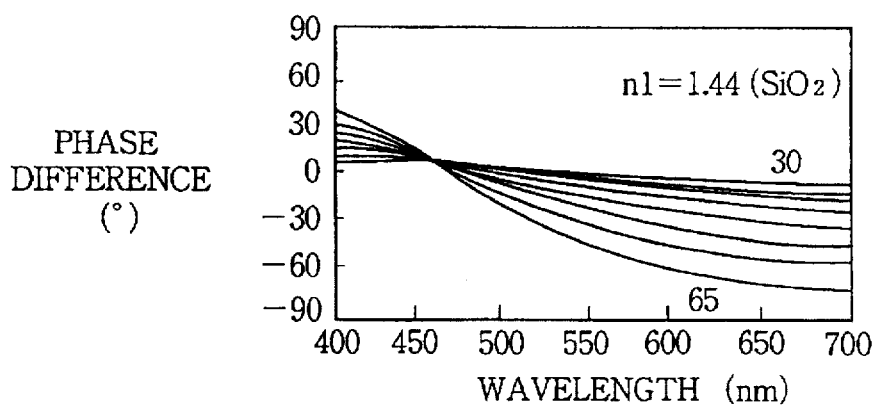
Figure 13:
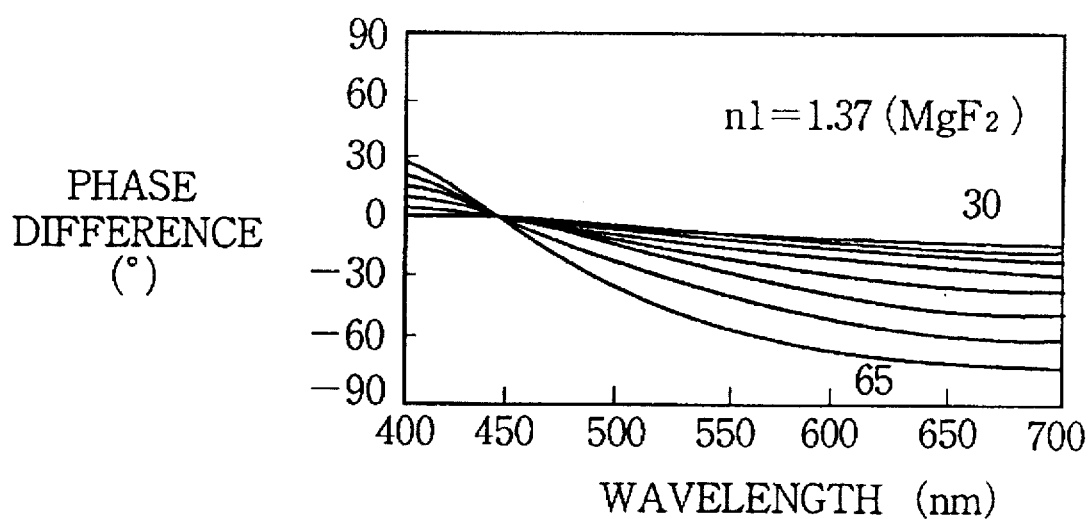

From the foregoing, it will be seen that if the refractive index n1 is reduced from FIGS. 12a to 13, the phase difference is reduced near a node. Here, the node is a point where there is no phase difference, namely a point where the curves are crossed on each other.

In order to improve the characteristic of incident angle at a predetermined wavelength λo, it is preferable to change the thickness of the dielectric film having a small refractive index so as to coincide a desired wavelength λo with the node.

Consequently, the phase difference is minimized in a wide range of the incident angle.

In order to minimize the phase difference at a wavelength λ1 other than the wavelength λ0, another dielectric film (second dielectric film) is layered on the aforementioned dielectric film (first film).

FIGS. 14a, 14b, 14c and 15 show characteristics of the incident angle of the reflecting mirror having double-layered dielectric films.

Figure 14:
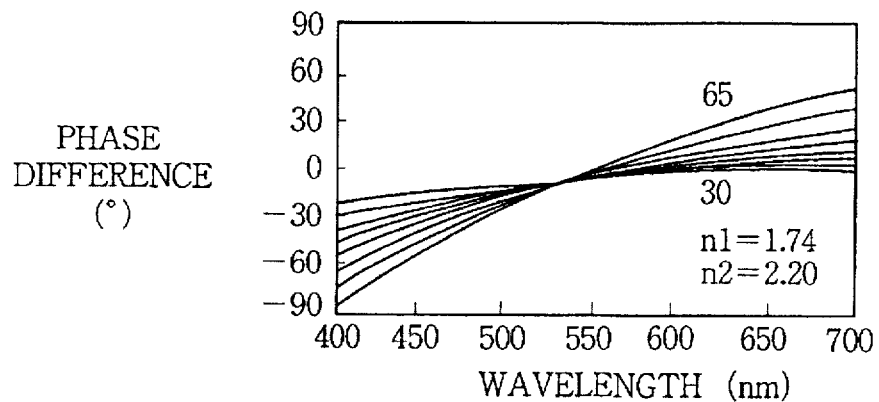
FIGS. 14a, 14b, 14c and 15 are diagrams showing characteristics of angles of incidence of double-layered dielectric films in dependency on refractive index.
Figure 14:
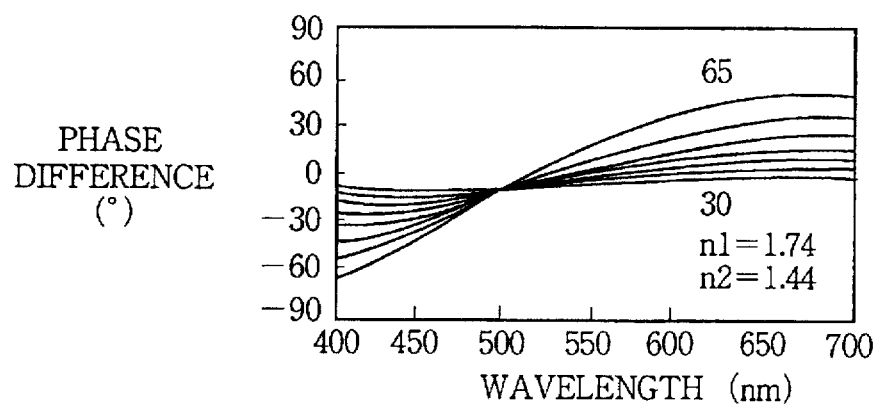
Figure 14:
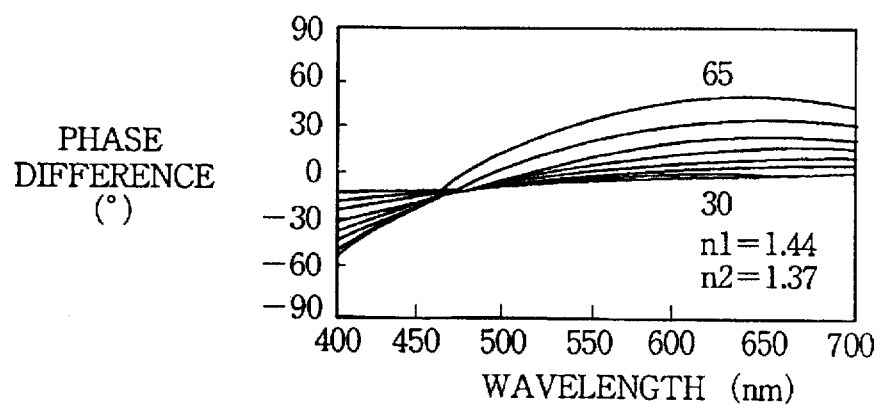
Figure 15:
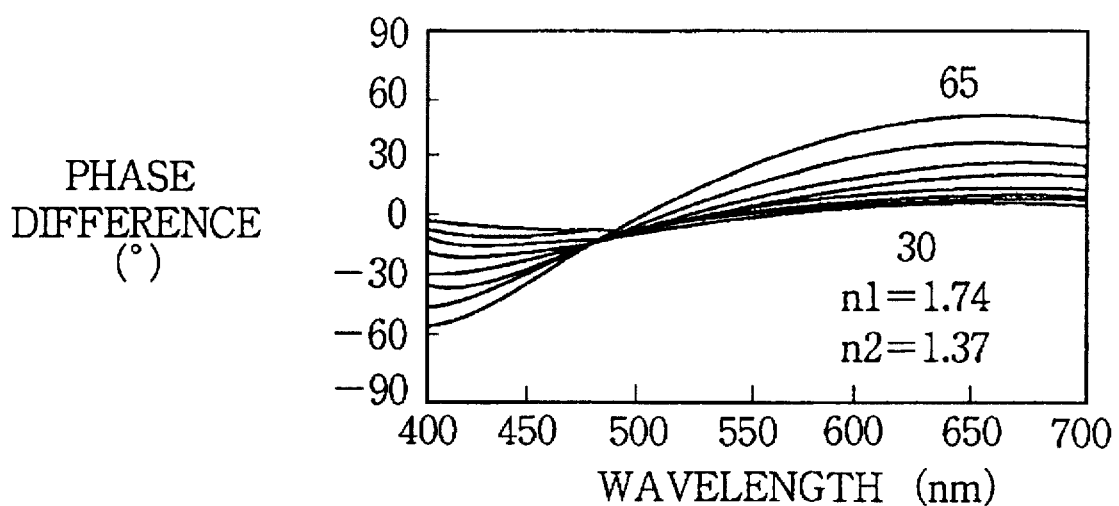

In FIG. 14a, the refractive index n1 of the first dielectric film is 1.74, and the refractive index n2 of the second dielectric film is 2.20. In FIG. 14b, the refractive index n1 of the first dielectric film is 1.74, and the refractive index n2 of the second dielectric film is 1.44. In FIG. 14c, the first refractive index n1 is 1.44, and the second refractive index n2 is 1.37. In FIG. 15, the first refractive index n1 is 1.74, and the second refractive index n2 is 1.37.

In FIGS. 14a, 14b and 15, the first refractive index n1 is set to 1.74 and the second refractive index n2 is reduced in order. It is seen that the phase difference is reduced near the node.

In FIGS. 14c and 15, the second refractive index n2 is set to 1.37, and the first refractive index n1 is 1.44 in FIG. 14c and 1.74 in FIG. 15. It is seen that the phase difference is small if the first refractive index n1 is large.

From the foregoing, it is ensured that if the second refractive index n2 is set smaller than the first refractive index n1, the phase difference is reduced near the node. Consequently, in order to improve the characteristic of the incident angle at the predetermined wavelength λ1, it is preferable to change the thickness of the second dielectric film which has the refractive index smaller than the first dielectric film.

Figure 16:
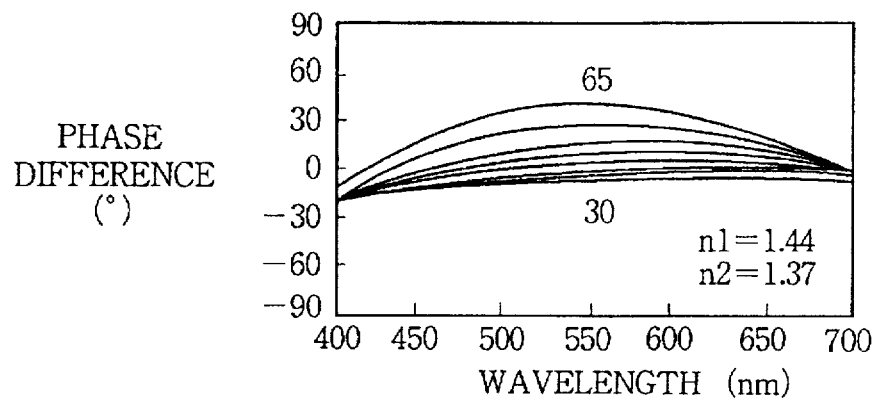
FIGS. 16a, 16b and 16c are diagrams showing characteristics of angles of incidence of double-layered dielectric films between nodes in dependency on refractive index.
Figure 16:
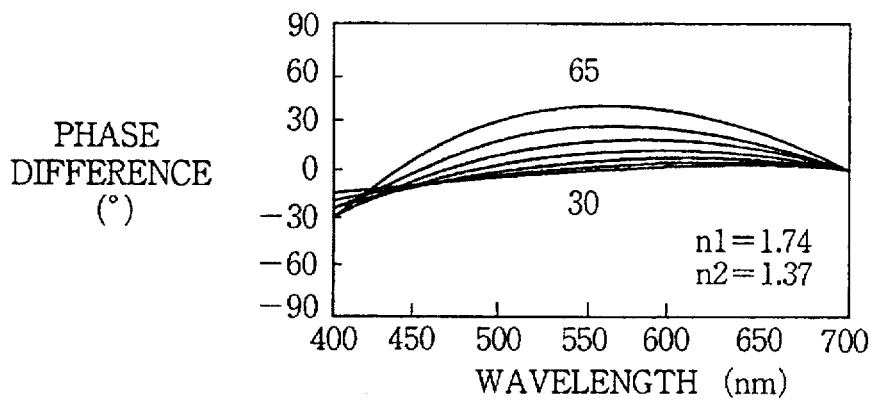
Figure 16:
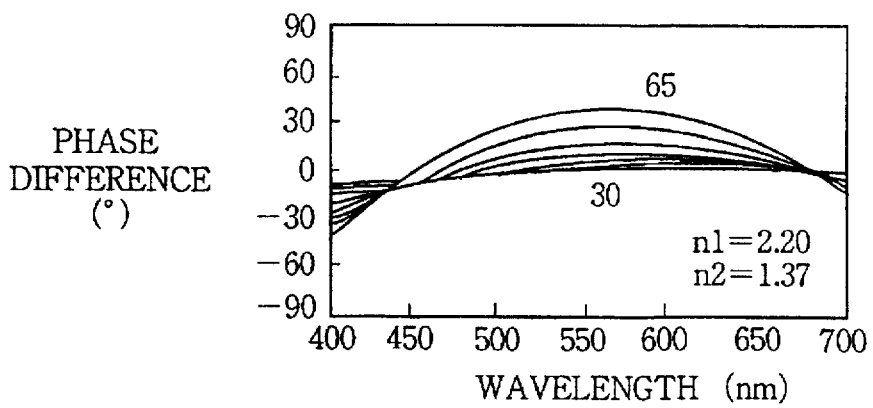

FIGS. 16a, 16b and 16c show characteristics of the incident angle of the reflecting mirror between nodes where the refractive index n2 of the second dielectric film is set to 1.37 and the refractive index n1 of the first dielectric film varies. In FIG. 16a, the refractive index n1 of the first dielectric film is 1.44. The first refractive index n1 of FIG. 16b is 1.74, and is 2.20 in FIG. 16c.

From the foregoing, it is ensured that the change of the phase difference with respect to the change of incident angle between nodes in FIG. 16c is minimum. It is preferable to use the double-layered dielectric film where the first dielectric film has the refractive index larger than the second dielectric film, and the difference between first and second refractive indexes are large.

If a multilayered dielectric film is employed, the manufacturing cost is increased, and efficiency is not increased irrespective of increase of the cost.

If a dielectric film layer having three layers or more is used, the phase is largely changed at a portion other than the node compared with the double-layer film. Thus, the double-layer film is mostly proper.

The incident angle is preferable between 0 and 65 degrees. If the light enters at 65 degrees or more, the size of the system becomes large.

The phase difference between P wave and S wave is preferable between −45 and 45 degrees. In the angles other than that range, it is difficult to obtain the clear stereoscopic image.

If a liquid crystal projector is used, the same effect is obtained.

Figure 17:
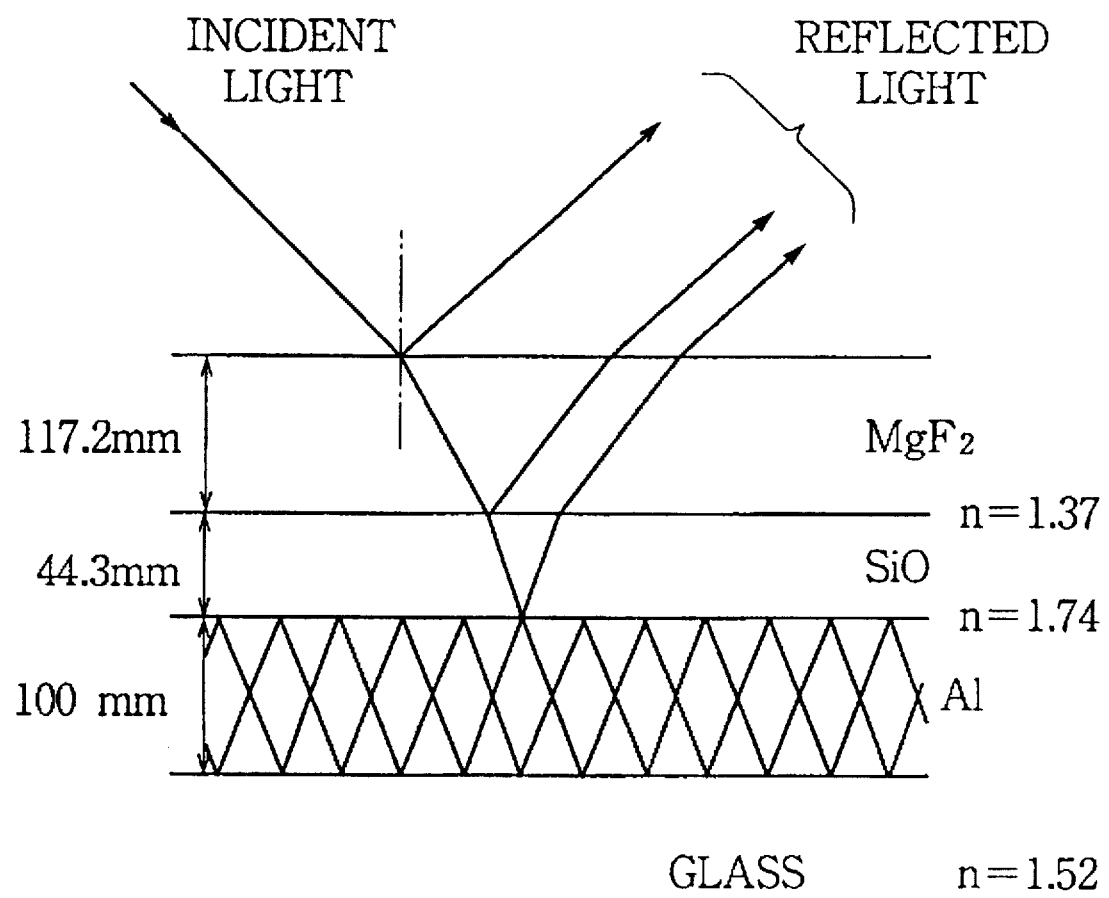
FIG. 17 is a schematic sectional view showing a reflecting mirror of the present invention.

FIG. 17 shows a reflecting mirror of the present invention.

As aforementioned in the item (a), Al is employed for a metallic film. As aforementioned in the item (b), the double-layered reflecting film comprises the first dielectric film coated on the Al film and having the refractive index 1.74, and the second dielectric film layered on the first dielectric film and having the refractive index 1.37.

As a material for the dielectric film, six materials such as $Ti_2O_3$, $ZRO_2$ (refractive index n=2.05), $Y_2O_3$ (n=1.87), SiO (n=1.90), $SiO_2$ (n=1.46), and $MgF_2$ (n=1.37) are preferable. Each of the materials is solely used, or two or more of them may be mixed with each other. The upper film is formed by the material having a small refractive index, and the lower film is formed by the material having a large refractive index.

In order to select the material, conditions such that the film is easily removed from the Al film, absorption of the film, strength, and the film is easily manufactured are totally considered. The refractive index differs in dependency on intensity of bulk caused by air mixed therein by vacuum deposition and coating. It is preferable to reduce the phase difference to zero at a cross point of the wavelengths of R and G, and the wavelengths of G and B.

The reflecting film of FIG. 17 can be varied by changing material, thickness and refractive index.

(4) SCREEN

As aforementioned, the screen 10 comprises the Fresnel lens 9 for condensing the light projected from the projection CRT 4 and reflected from the reflecting mirror, and the lenticular sheet 8 for properly diffusing the condensed light in the horizontal direction.

The Fresnel lens 9 and the lenticular sheet 8 are made of materials each of which has a small optical elastic coefficient. The lenticular sheet 8 is so arranged that the direction of the lenticular lens in the lenticular sheet coincides with the direction of the incident light, whereby the polarized condition of the incident light is not affected in phase by the lenticular sheet.

In addition, in the rear projection type, the light for the left eye and the light for the right eye from the projector are subjected to the phase distortion by the double reflection when passing through the screen. If a component of the light for the right eye enters the left eye, or a component of the light for the left eye enters the right eye, the stereoscopic likeness is reduced. Therefore, here the ratio of the necessary light to the unnecessary light is defined as s contrast ratio, the stereoscopic likeness decreases as the contrast ratio decreases.

Japanese Patent Application Laid-Open 3-89236 discloses an example for solving the above described disadvantage. In the example, an ideal phase characteristic of the screen disposed between the light source and the polarizing glasses is disclosed.

FIG. 18 shows the ideal phase characteristic of the screen disposed between the light source and the polarizing glasses.

In an example A, the light projected from the light source and the light transmitted from the screen are circularly polarized light. The light phase difference for obtaining an infinite contrast ratio is $N\pi$ radian, where N is the positive and negative numbers of integer.

In an example B, the light from the light source is circularly polarized light, and the light from the screen is linearly polarized light. The light phase difference for obtaining infinite contrast ratio is $N\pi \pm \pi/2$ radian.

In examples C and D, each of the light from the light source is linearly polarized light, and the light from the screen is linearly polarized light, and circularly polarized light, respectively. The light phase differences for obtaining infinite contrast ratio of are $N\pi$ radian, and $N\pi \pm \pi/2$ radian, respectively.

In an example E, the light from the light source is linearly polarized light, and the light from the screen is linearly polarized light. Thus, the polarized surface of the linearly polarized light is equal to the direction of the main axis, so that an ideal output of linearly polarized light is obtained irrespective to the phase difference.

If luminous intensity of the light for the left eye passing through a right-eye polarizing plate is Ilc (unnecessary light), luminous intensity of the light for the right eye passing through the right-eye polarizing plate is I2c (necessary light), and phase difference at the screen is Δδ, each luminous intensity is represented as follows.

$$I1c = a^2 \sin^2(\Delta\delta/2) \quad (1)$$

$$I2c = a^2 \sin^2(\Delta\delta/2 + \pi/2) \quad (2)$$

where the phase difference Δδ represents a deflection from the ideal value shown in FIG. 18, and the suffix c is the circularly polarized light, and the suffix 1 is the linearly polarized light.

Thus, contrast ratio is represented as follows.

$$I2c/I1c = \cot^2(\Delta\delta/2) \quad (3)$$

Ordinarily, the limit of the visible contrast ratio of the stereoscopic image is 10, a contrast ratio necessary to obtain a preferable image is 30 or more, and a contrast ratio necessary to obtain a perfect image is 50 or more. In order to obtain 10 or more contrast ratio, the phase difference Δδ for the screen is 0.2 radian or less. For 30 or more contrast ratio, the phase difference Δδ is 0.11 radian or less, and for 50 or more contrast ratio, the phase difference Δδ is 0.09 radian or less. Consequently, it is necessary to determine the phase difference Δδ to be 0.2π radian or less.

From the foregoing, it will be seen that the phase difference Δδ is determined so as to obtain the contrast ratio at least of 10 or more.

If both of the incident light and the reflected light of the screen are the same mode, the phase difference Δδ is determined in the range as follows.

$$(N-0.2)\pi \leq \Delta\delta \leq (N+0.2)\pi$$

If the incident light and the reflected light from the screen are the different mode, the phase difference Δδ is determined in the range as follows.

$$(N\pm 1/2 - 0.2)\pi \leq \Delta\delta \leq (N\pm 1/2 + 0.2)\pi$$

(5) JOINT OF THE SCREEN

There has been proposed a multiple projection display system in which a plurality of stereoscopic image display devices one of which is shown in FIG. 1 are arranged in matrix to provide a large screen.

Figure 19:
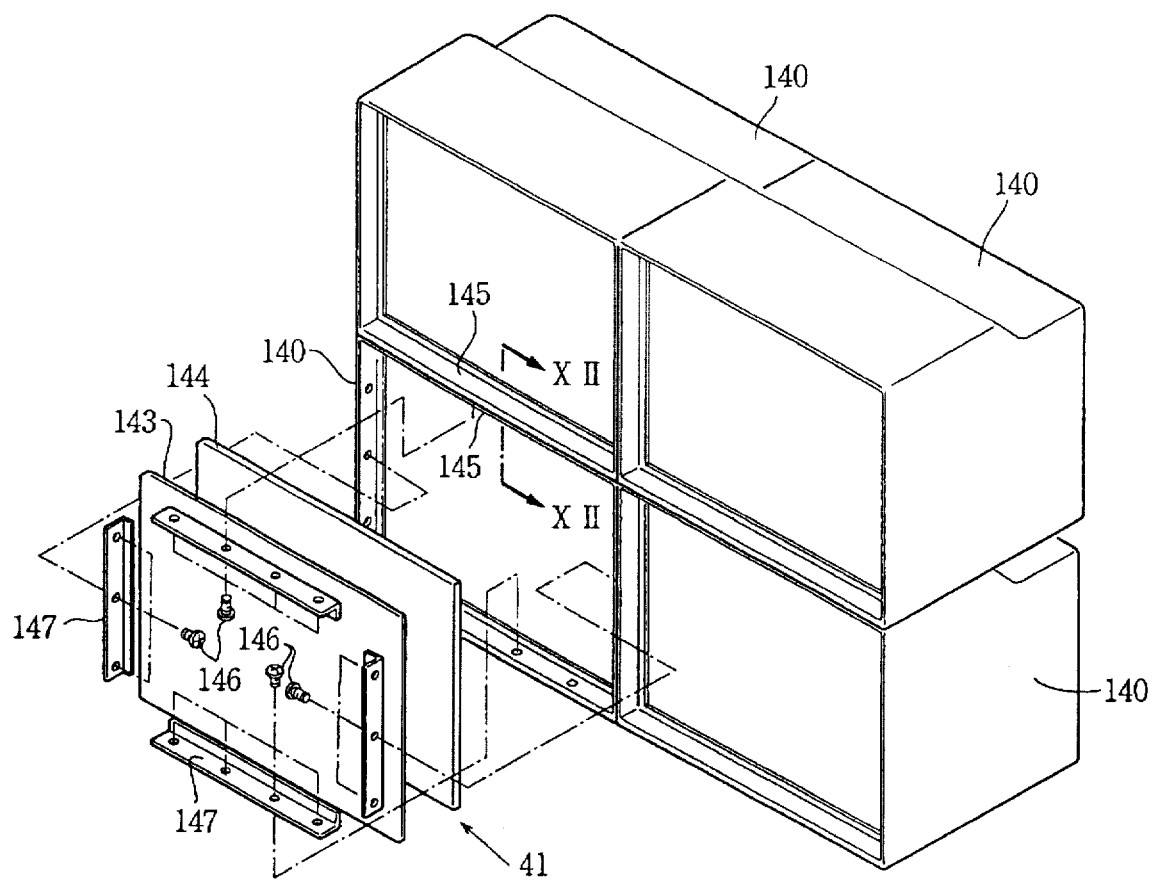
FIG. 19a is a perspective view showing a conventional multiple projection display system.
FIG. 19b is a sectional view showing a mounting structure of a screen of the conventional system.
Figure 19:
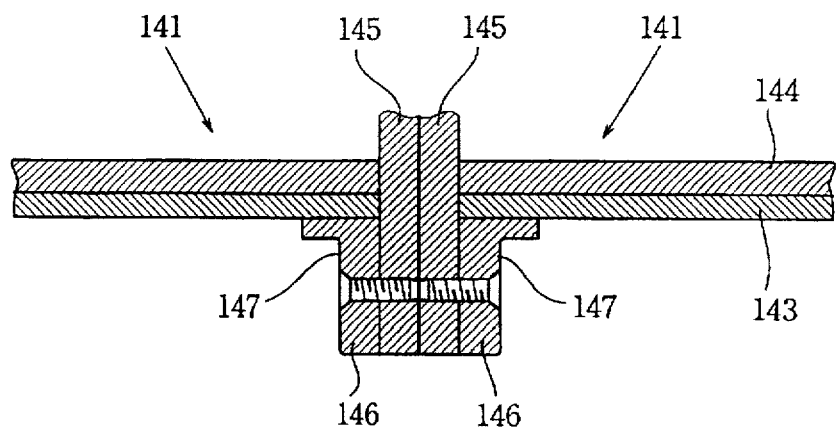

FIG. 19a shows a conventional multiple projection display system. A plurality of projection unit 140, for example 4 units, are disposed in matrix to form a large display. Each projection unit 140 has a screen 141 secured to a front portion of the unit. The screen 141 comprises a Fresnel lens 144 and a lenticular sheet 143. The screen 141 is attached to the unit with four support frames 147 and screws 146.

FIG. 19b shows a mounting structure of the screen for connecting adjacent screens. Each screen 141 is attached to a bordering frame 145 of the projection unit 140, and the support frame 147 is attached to the peripheries of the screen 141 and the bordering frame 145. The adjacent bordering frames 145 and support frames 147 are secured by the screw 146. Thus, the screen is secured to the projection unit.

However, in such a structure, the light projected from the display device is blocked by frames 145 and 147 so that a joint of a cross shape appears on the screen 141. Such a joint deteriorates the characteristic of stereoscopic image, particularly, a three-dimensional image characteristic.

Figure 20:
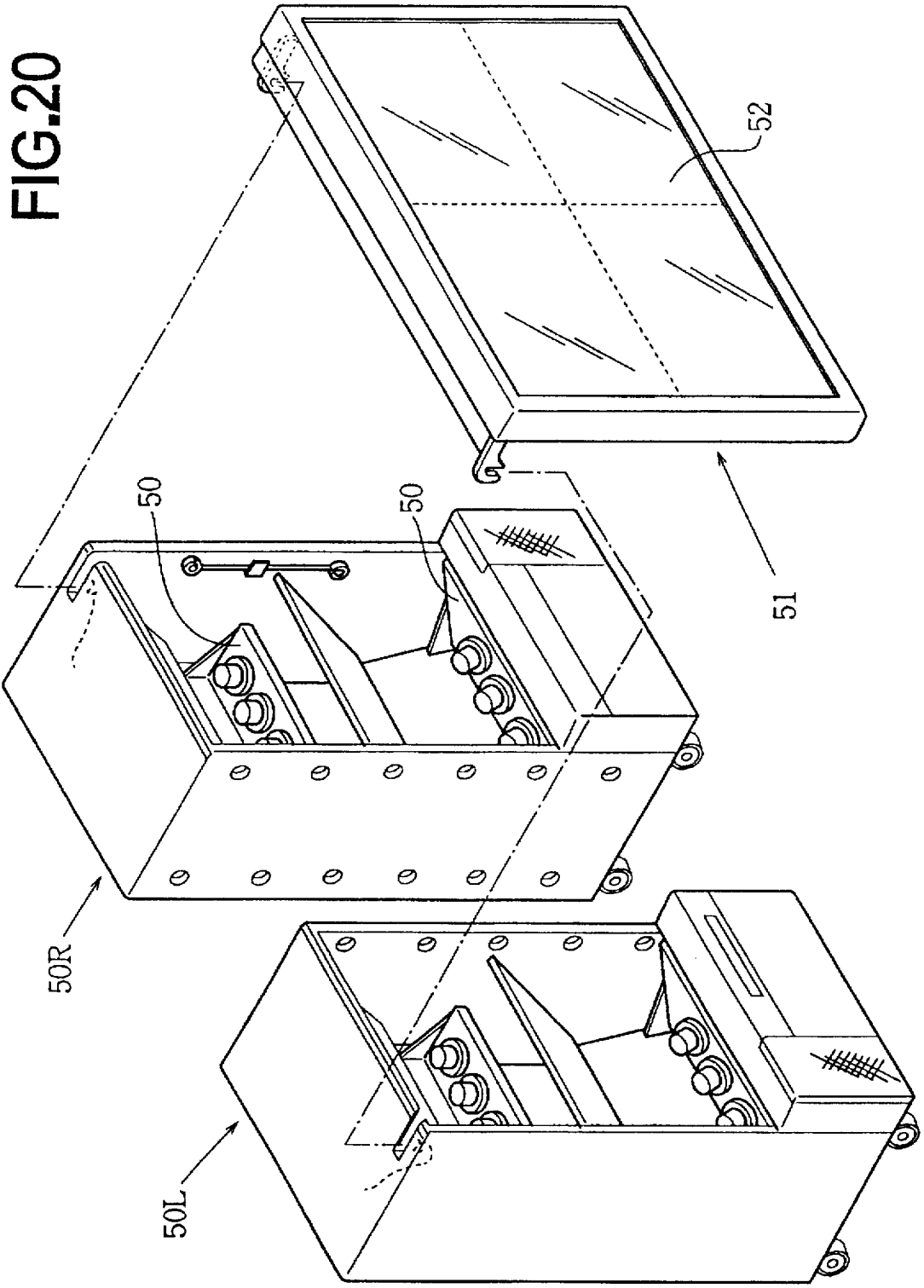
FIG. 20 is an exploded perspective view showing a multiple projection display system of the present invention.

Referring to FIG. 20 showing a multiple projection display system of the present invention, which is disclosed in Japanese Patent Publication 6-105336 submitted by the applicant.

The system comprises a right projection device 50R and a left projection device 50L secured to each other at adjacent side portions. Each projection device has upper and lower projection CRT units 50. A screen unit 51 having a screen 52 is disposed on a front portion of the integrated projection devices 50R and 50L.

Figure 21:
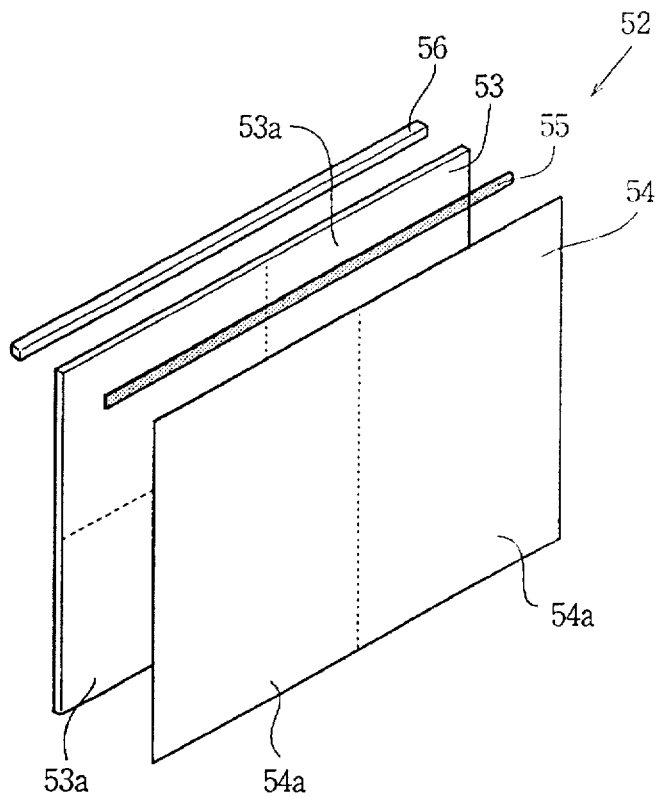
FIG. 21a is an exploded perspective view showing a screen of the multiple projection display system.
FIG. 21b is an exploded perspective view showing a mounting structure of the screen.
Figure 21:
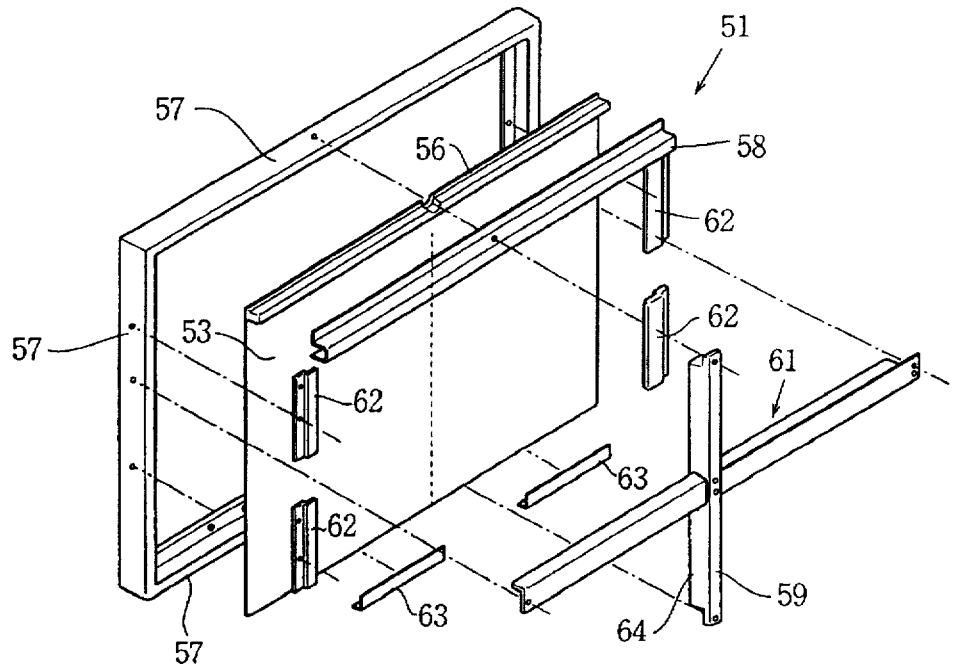

Referring to FIG. 21a, the screen 52 comprises a Fresnel lens 53 consisting of four sheets of Fresnel lenses 53a adhered to each other, and a lenticular sheet 54 consisting of a pair of lenticular sheets 54a joined to each other. The Fresnel lens 53 and the lenticular sheet 54 are adhered to each other by a double-face adhesive tape 55 to form the screen 52. A holder frame 56 made of acrylic is adhered to the upper portion of the screen 52 so that the screen is adapted to be suspended.

Referring to FIG. 21b showing an assembly method of the screen unit 51, the screen unit comprises a rectangular frame 57 in which the screen 52 to be mounted. A suspension frame 58 having a U-shaped cross section is engaged with the holder frame 56 of the screen and secured to the upper inside portion of the frame 57 so that the screen is suspended in the frame 57. A cross-shaped light-shielding black frame 61 comprising a vertical frame 59 and a horizontal frame 60 is attached to the rear of the screen and secured to the suspension frame 58. A plurality of vertical and horizontal holders 62 and 63 are provided, and parts of the screen 52 except for the upper portion are secured to the frame 57 by the holders.

The back surface of the screen 52 is divided into four areas by the cross-shaped light-shielding black frame 61 corresponding to four projection CRT units 50 in the display devices. The vertical frame 59 and the horizontal frame 60 of the cross-shaped light-shielding black frame 61 are attached to the screen corresponding to vertical and horizontal joints of the screen for shielding the rays of light projected from the projection CRT units, so that the images projected from CRT units are not overlapped with each other at the joints.

Figure 22:
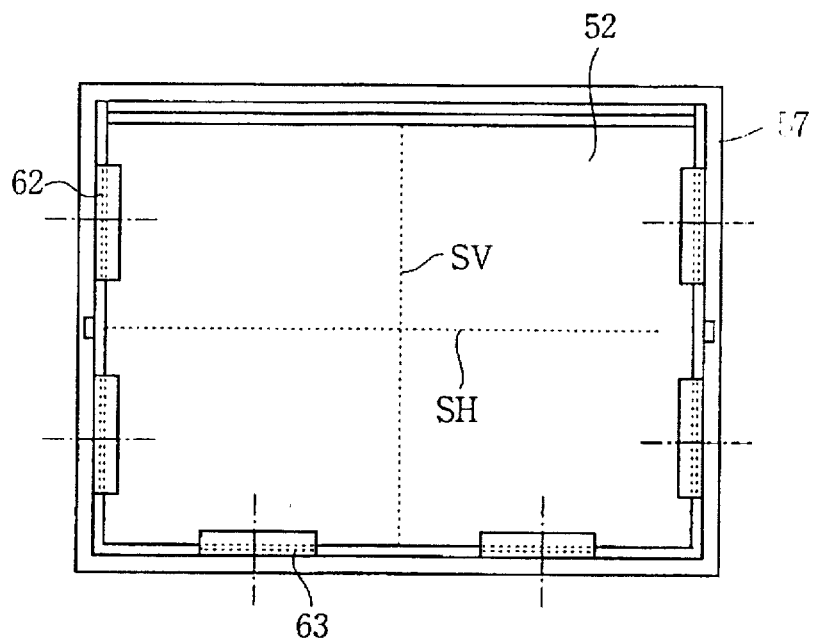
FIGS. 22a and 22b are explanatory views showing the screen.
Figure 22:
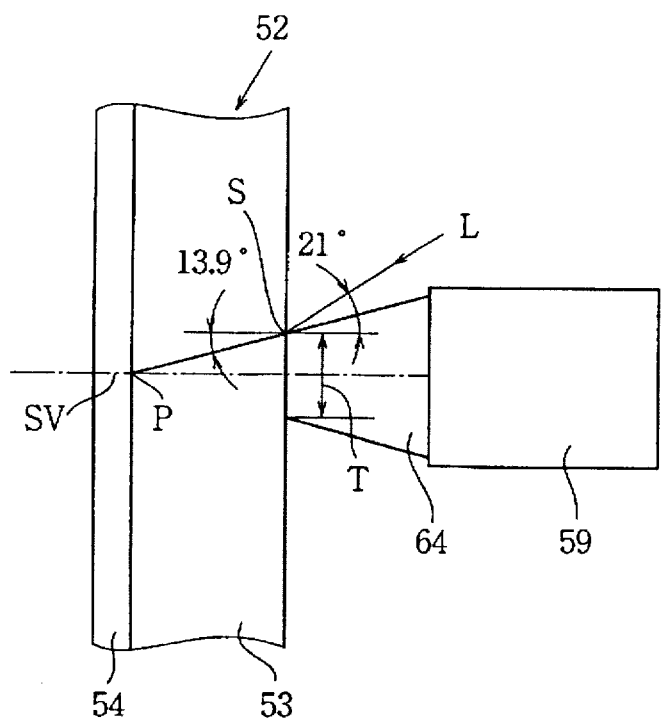

FIGS. 22a and 22b show the above describe method for preventing image overlapping. The screen 52 has a vertical imaginary joint line SV formed by joining right and left lenticular sheets 54a, and a horizontal imaginary joint line SH formed by joining upper and lower Fresnel lens sheets 53a.

In order to prevent right and left lines from the right and left CRTs from overlapping on the line SV, it is necessary to prevent a ray of light from entering the Fresnel lens 53 at a point inside a striking point S of the light L which reaches at a point P on the vertical joint line SV.

The vertical frame 59 of the cross-shaped light-shielding black frame 61 has a shielding member 64 tapered to the points S. Rays of light projected from the right and left projection CRT units in the projection devices 50R and 50L are shielded by the shielding member 64 and not overlapped. Thus, overlapping of images on the vertical joint line on the screen is prevented. The thickness T of the shielding member 64 at an end is 1.5 mm, in consideration of a perspective angle of the projection CRT unit and the thickness of the Fresnel lens.

Similarly, the horizontal frame 60 is provided with a shielding member for preventing overlapping of images on the a horizontal joint line in the same manner as aforementioned.

As disclosed in Japanese Patent Publication 6-105336, the shielding member of the horizontal frame 60 may be externally controlled, with effect of the invention.

Figure 23:
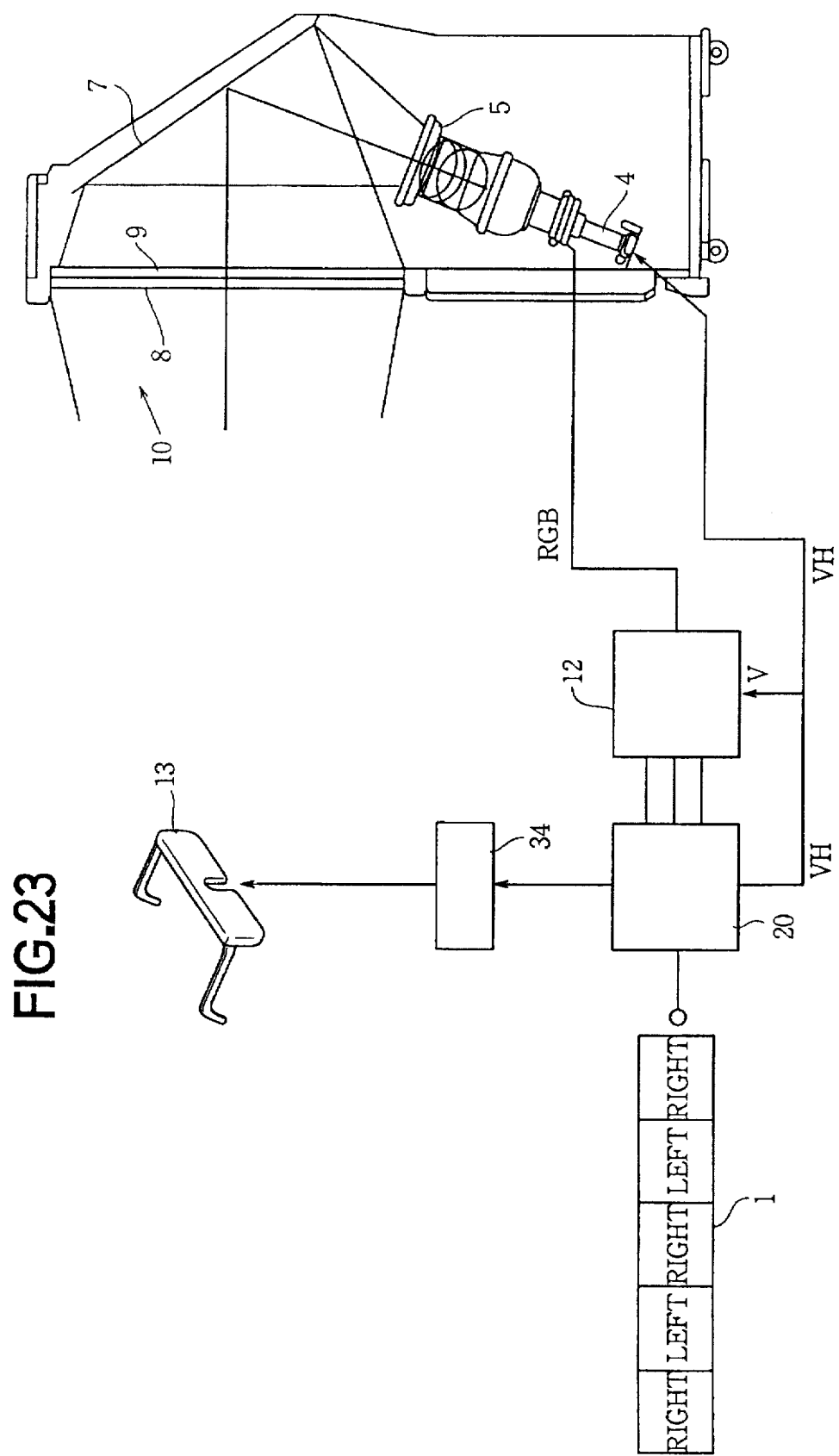
FIG. 23 is a schematic diagram showing a second embodiment of the display system of the present invention.

FIG. 23 shows a second embodiment of the present invention. A pair of polarizing glasses 13 have a liquid crystal shutter formed therein. The shutter has the same characteristics as the shutter 6 of the first embodiment. The driving circuit 34 is connected to the polarizing glasses 13 through a lead for driving the shutter. Thus, the effect as the first embodiment is obtained.

Figure 24:
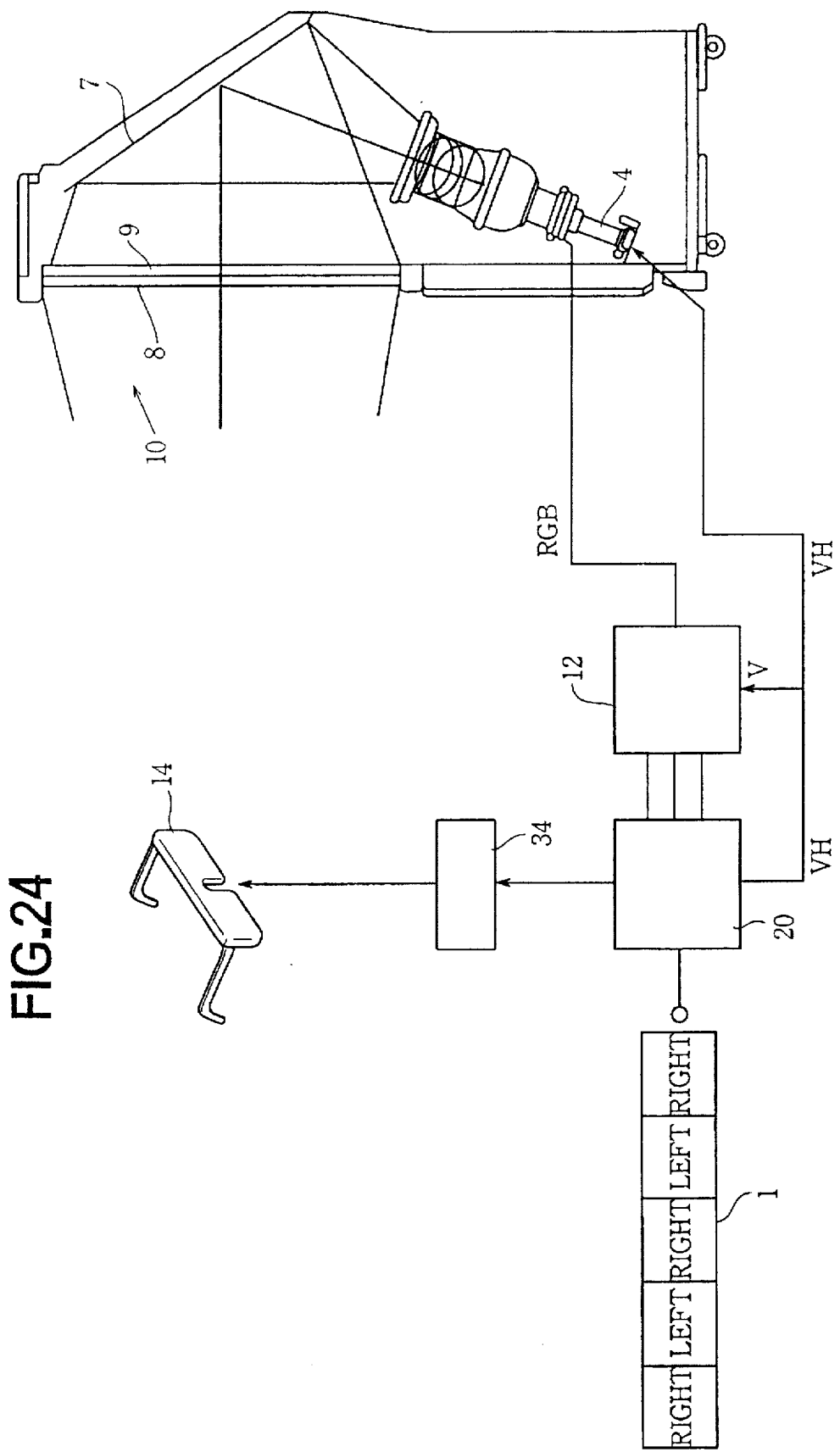
FIG. 24 is a schematic diagram showing a third embodiment of the present invention.

Referring to FIG. 24 showing a third embodiment, a pair of polarizing glasses 14 have a pair of polarizing plates 5 secured to the opposite sides of the liquid crystal shutter formed in the glasses. Consequently, it is not necessary to coincide the polarizing characteristics of the shutter 6 and polarizing glasses 11 of the first embodiment. Thus, the polarizing glasses 14 are solely used as a part having a good separation characteristic of right-eye and left-eye images. The polarizing glasses 14 are used for other types of stereoscopic image display systems.

In accordance with the present invention, parts of the system such as projection CRT, shutter, reflecting mirror and screen are formed to develop the characteristics thereof causing the stereoscopic image to deteriorate. Consequently, the system having a good separation characteristic of right-eye and left-eye images is provided.

While the invention has been described in conjunction with preferred specific embodiment thereof, it will be understood that this description is intended to illustrate and not limit the scope of the invention, which is defined by the following claims.

What is claimed is:

1. A stereoscopic image display system comprising:

left/right stereoscopic image signal generator means for alternately generating red, green, blue (RGB) signals of a left-eye image signal and a right-eye image signal having a parallax at every field;

a cathode ray tube (CRT) applied with the RGB signals;

a screen for projecting image light of the RGB signals;

shutter means having a liquid crystal shutter with a pair of polarizing plates disposed in inlet and outlet sides; and driving means for driving the liquid crystal shutter and for rotating the polarizing plate, therein displaying stereoscopic images dependent on the left/right stereoscopic image signal, wherein the CRT having a persistence characteristic represented by the following formulas, where s1 represents an amount of luminous intensity between a time t0 and a time t1 by a time interval $\Delta t$, s2 represents an amount of luminous intensity obtained by integrating luminous intensity between a time t2 and a time t3 by the time interval $\Delta t$, and f represents a function of time, $$s1/s2 \leq 100 \text{ and } f(0)/10 > f(1.3)$$

where $$s1 = \lim_{n1 \to \infty} \sum_{i=t0}^{n1} f(i) \cdot \Delta t$$

$$n1 = (t1 - t0)/\Delta t$$

$$s2 = \lim_{n2 \to \infty} \sum_{j=t2}^{n2} f(j) \cdot \Delta t$$

$$n2 = (t3 - t2)/\Delta t$$

t0 is a stopping time of application of the image signal to the CRT, t1 is a predetermined elapsed time after t0, t2 is a predetermined elapsed time after t1, t3 is a predetermined elapsed time after t2;

the liquid crystal shutter having a response speed of 1 ms or less, and a contrast between black and white of 100 to 1 or more at a central wavelength of an emission spectrum of the CRT in both parallel and crossing modes of the polarizing plates of the shutter, and a cell gap of 3 μm or less; and the screen including a Fresnel lens and a lenticular sheet, and the lenticular sheet being disposed in a direction so that a polarizing condition does not generate a phase difference based on the lenticular sheet.

2. The system according to claim 1 further comprising a reflecting mirror for reflecting the image light from the CRT and for projecting the reflected light to the screen, wherein the reflecting mirror comprises a glass, a metallic film coated on the glass, double-layered dielectric films, thickness and refractive index of each of the dielectric films are set to predetermined values respectively, so that the phase difference between the plane (P) wave and the transverse (S) wave is between −45 and 45 degrees when an incident angle of the image light is between zero and 65 degrees.

3. The system according to claim 1 further comprising horizontal scanning means having a higher scanning frequency than a horizontal scanning frequency of the stereoscopic image signal.

4. The system according to claim 1 wherein each of the Fresnel lens and the lenticular sheet is made of a material having a small optical elastic coefficient.

5. The system according to claim 1 wherein the CRT comprises three CRTs of R, G and B, the shutter means is disposed at a front side of each of the CRTs, and a peak of an emission spectrum of each CRT coincides with a lowermost part of a transmission spectrum of the liquid crystal shutter.

6. The system according to claim 2 wherein the metallic film is formed by aluminum, the dielectric films comprise a first dielectric film of a material including SiO, and a second dielectric film of a material including $MgF_2$.

7. The system according to claim 2 wherein each of the dielectric films includes at least one compound selected from $Ti_2O_3$, $ZRO_2$, $Y_2O_3$, SiO, $SiO_2$ and $MgF_2$.

8. A stereoscopic image display system comprising:

a plurality of projection units arranged vertically or horizontally, each of the projection units including left/right stereoscopic image signal generator means for alternately generating red, green, blue (RGB) signals of a left-eye image signal and a right-eye image signal having a parallax at every field, a cathode ray tube (CRT) applied with the RGB signals, a screen for projecting image light of the RGB signals, shutter means having a liquid crystal shutter with a pair of polarizing plates disposed in inlet and outlet sides, and driving means for driving the liquid crystal shutter and for rotating the polarizing plate, therein displaying stereoscopic images dependent on the left/right stereoscopic image signal, wherein the screens of all units being joined to each other to form a single screen, the joined screen being supported in a frame in a suspended condition, a cross-shaped light-shielding black frame being attached to the frame to prevent overlapping of images on adjacent screens;

the CRT having a persistence characteristic represented by following formulas, where s1 represents an amount of luminous intensity between a time t0 and a time t1 by a time interval $\Delta t$, s2 represents an amount of luminous intensity obtained by integrating luminous intensity between a time t2 and a time t3 by the time interval Δt, and f represents a function of time, $$s1/s2 \geq 100 \text{ and } f(0)/10 > f(1.3)$$

where $$s1 = \lim_{n1 \to \infty} \sum_{i=t0}^{n1} f(i) \cdot \Delta t$$

$$n1 = (t1 - t0)/\Delta t$$

$$s2 = \lim_{n2 \to \infty} \sum_{j=t2}^{n2} f(j) \cdot \Delta t$$

$$n2 (t3 - t2)/\Delta t$$

t0 is a stopping time of application of the image signal to the CRT, t1 is a predetermined elapsed time after t0, t2 is a predetermined elapsed time after t1, t3 is a predetermined elapsed time after t2;

the liquid crystal shutter having a response speed of 1 ms or less, and a contrast between black and white of 100 to 1 or more at a central wavelength of an emission spectrum of the CRT in both parallel and crossing modes of the polarizing plates of the shutter, and a cell gap of 3 μm or less; and the screen including a Fresnel lens and a lenticular sheet, and the lenticular sheet being disposed in a direction so that a polarizing condition does not generate a phase difference based on the lenticular sheet.

* * * * *